US011156501B1

(12) United States Patent
Zhang

(10) Patent No.: US 11,156,501 B1
(45) Date of Patent: Oct. 26, 2021

(54) PLANT SPECTROPOLARIMETRIC IMAGING DEVICE AND METHOD

(71) Applicant: Aizhong Zhang, Rochester, NY (US)

(72) Inventor: Aizhong Zhang, Rochester, NY (US)

( * ) Notice: Subject to any disclaimer, the term of this patent is extended or adjusted under 35 U.S.C. 154(b) by 0 days.

(21) Appl. No.: 16/900,966

(22) Filed: Jun. 14, 2020

(51) Int. Cl.
| | |
|---|---|
| *G01J 3/28* | (2006.01) |
| *G01J 3/10* | (2006.01) |
| *G01J 3/447* | (2006.01) |
| *G01J 3/12* | (2006.01) |
| *G02B 27/28* | (2006.01) |
| *G01J 3/36* | (2006.01) |

(52) U.S. Cl.
CPC .............. *G01J 3/2823* (2013.01); *G01J 3/108* (2013.01); *G01J 3/1256* (2013.01); *G01J 3/36* (2013.01); *G01J 3/447* (2013.01); *G02B 27/283* (2013.01); *G01J 2003/2826* (2013.01)

(58) Field of Classification Search
CPC .... G01J 3/02; G01J 3/28; G01J 3/2803; G01J 3/10; G01J 3/2823
USPC ......................................................... 356/326
See application file for complete search history.

(56) References Cited

U.S. PATENT DOCUMENTS

| | | | |
|---|---|---|---|
| 2,616,334 A | 11/1952 | Zernike | |
| 3,628,848 A | 12/1971 | Nomarski | |
| 5,521,705 A | 5/1996 | Oldenbourge et al. | |
| 5,559,630 A | 9/1996 | Ho et al. | |
| 5,751,475 A | 5/1998 | Ishiwata et al. | |
| 5,764,363 A | 6/1998 | Ooki et al. | |
| 6,618,145 B1 | 9/2003 | Goldstein et al. | |
| 6,924,893 B2 | 8/2005 | Oldenbourg et al. | |
| 7,715,013 B2 | 5/2010 | Glaser et al. | |
| 8,953,158 B2 | 2/2015 | Moshe et al. | |
| 2010/0185067 A1* | 7/2010 | Gupta | ................... G01J 3/2823 600/323 |
| 2020/0333312 A1* | 10/2020 | Islam | ................... G01J 3/2823 |

OTHER PUBLICATIONS

Hagen, Gao, Tkaczyk, and Kester "Snapshot advantage: a review of the light collection improvement for parallel high-dimensional measurement systems." Opt.Eng.51,11(2012)111702.

(Continued)

*Primary Examiner* — Md M Rahman
(74) *Attorney, Agent, or Firm* — Lynne M. Blank, Esq.

(57) ABSTRACT

A method and device of plant spectropolarimetric imaging is disclosed. A device comprising a first illuminator to direct light toward at least a portion of a plant with epi-illumination, a second illuminator to direct light toward at least a portion of a plant with transillumination, wherein the first and second illuminators are broadband, covering visible and infrared spectra; an imaging system to form images; a detection system to record the images, wherein the detection system measures in a plurality of spectral channels; and a computer to display and analyze the recorded images from the detection system. The detection system or the imaging system, comprises a polarization analyzer system. A method comprising directing light from at least one broadband illuminator toward at least a portion of a plant; forming images with an imaging system; recording the images with a detection system; and analyzing the recorded images with a computer.

19 Claims, 17 Drawing Sheets

(56) References Cited

OTHER PUBLICATIONS

Goldstein and Cox. "Spectropolarimetric properties of vegetation." In Polarization: Measurement, Analysis, and Remote Sensing VI, vol. 5432, pp. 53-62 Int.Soc.Opt.Photonics(2004).

Patty,Luo,Snik,Ariese,Buma,Kate,Spanning "imaging linear & circular polarization features in leaves with complete Mueller matrix polarimetry" BiochimBiophysAct1862,6(2018)1350.

Gao "NDWI—A normalized difference water index for remote sensing of vegetation liquid water from space." Remote sensing of env. 58, No. 3 (1996) 257-266.

Lu, Shih-Yau, and Russell A. Chipman. "Interpretation of Mueller matrices based on polar decomposition." JOSA A 13, No. 5(1996): 1106-1113.

Chipman, Russell A. "Polarimetry." Handbook of Optics 2 (1994): 22-1.

Smola, Alex J., and Bernhard Schölkopf. "A tutorial on support vector regression." Statistics and computing 14, No. 3 (2004): 199-222.

Oka, Haga, Michida "Snapshot Mueller-matrix spectropolarimeter using spectral and spatial carriers." Polariz Sci & Remote Sensing VII, vol. 9613, p. 96130E IntSocOpt&Photonics2015.

\* cited by examiner

PLANT SPECTROPOLARIMETRIC IMAGING DEVICE AND METHOD

FIELD OF THE INVENTION

This invention relates to the field of imaging of plants for agriculture management, in particular, to plant evaluation with spectropolarimetric imaging devices and methods.

BACKGROUND OF THE INVENTION

Plant growth monitoring and disease control are indispensable for modern agriculture. Optical imaging techniques could provide critical phytological information of the spatial and temporal variability of the plant field at the sub-leaf (leaf components) level, single leaf level, and the canopy level. Plant responses under biotic and abiotic stresses could be revealed by imaging. Abiotic stresses are caused by non-living factors, including high soil salinity, drought, flooding, wind, chilling exposure, and light overexposure, etc. Biotic stresses are caused by living organisms, such as bacteria, viruses, fungi, parasites, insects, weeds, etc. Specifically, fungal and fungal-like diseases, for example, rust, downy mildew (caused by fungus-like organisms of oomycetes), leaf spot, *Botrytis cinerea* (gray mold), affect a wide range of plants worldwide. Targeted detection and treatment of these common plant stresses are vital to a satisfactory yield for farmers and gardeners. Early detection of stressors or pathogens could reduce the necessary amount of pesticide or fungicide, and minimize crop losses.

For example, rust fungi are caused by pucciniales, which are the most speciose plant pathogens. The name "rust" comes from the rusty orange to brown color of urediniospores or aeciospores that are clonally or sexually produced. Rusts affect thousands of species of vascular plants worldwide, including economically important plants, such as wheat, soybean, coffee, etc. Many rust fungi feature "host jumps", where two unrelated species of host plants are required to complete a life cycle. Rust fungi favor mild, moist conditions.

The rust life cycle starts with the germination of teliospores after overwintering or oversummering. Teliospores produce basidiospores to travel to another host by wind to infect host tissue to produce haploid spermogonia, which produce simple spores of spermatia. Surface moisture or insects distribute spermatia, which results in fertilization, where two haploid nuclei merge into a single cell, and the aeciospores are formed. Aeciospores can travel long distances to infect another host by invading through stomata to form a uredinium with urediniospores, which can rapidly spread. Uredinia turn into telia late in the growing season to form thick-walled teliospores to rest in a dormant state.

Other common plant diseases include, for example, downy mildew, gray mold, leaf spot, early blight, and late blight.

After plant stress responses are determined, if the stressor is abiotic, proper environmental or nutritional adjustments are usually implemented to relieve the stress. If the stressor is biotic, pesticides or fungicides are usually sprayed to the plants, when disease symptoms are first noticed, and disease types identified. However, excessive pesticide and fungicide may adversely affect the food safety and the quality of the agricultural produce, as well as increase the financial burden of farmers. In order to minimize the economic impact of the stressors, early detection is essential in plant management.

Noninvasive imaging techniques and subsequent imaging analysis are required to monitor stress incidence and stress severity, in order to meet growing challenges in precision agriculture. Optical sensors used in agriculture often generate a large amount of raw data, hence data mining, machine learning and statistical analyses are frequently used to reduce the data dimension while maintaining critical phytological information.

Multispectral imaging is an imaging method that capture images of an object in several spectral bands. The spectral bands may be obtained by spectral filters and different detectors that are sensitive to particular wavelength ranges. The number of multispectral imaging spectral bands is usually fewer than 20.

Hyperspectral imaging is an imaging method that combines imaging with spectroscopy, where there are a lot more spectral channels than multispectral imaging. Usually hundreds or thousands of spectral channels are used. Hyperspectral channels are usually contiguous, and the spectral resolution is usually much higher than multispectral imaging. Because of the extra spectral dimension, the resultant images are "hypercubes" with (x, y, $\lambda$) three dimensions, where (x, y) are the two spatial dimensions, and $\lambda$ represents the spectral dimension.

Multispectral and hyperspectral imaging sensors have been used in the prior art to grade agricultural products, as in U.S. Pat. No. 8,953,158, or to characterize plant growth and disease with remote sensing, as in U.S. Pat. No. 7,715,013.

Over the past decades, a series of snapshot imaging spectrometers with higher optical throughput have been developed, which could record the 3D hypercube or even higher dimensional dataset in a single snapshot. Various designs of these snapshot imaging spectrometers, including computed tomographic imaging spectrometry (CTIS), coded aperture snapshot spectral imaging (CASSI), image mapping spectrometry (IMS), etc. have been described by Hagen, et al. in "*Snapshot advantage: a review of the light collection improvement for parallel high-dimensional measurement systems.*" Optical Engineering 51, no. 11 (2012).

Polarized light microscopy improves the image contrast by utilizing the polarization properties of the illumination light and a sample, which has been used for more than a century to investigate birefringent materials. Some variations of polarized light microscopy are disclosed in U.S. Pat. Nos. 5,521,705, 5,559,630, 5,764,363, 6,924,893. Quantitative measurements with polarized light microscopy have been widely used in the field of crystallography. Other polarization imaging techniques, such as phase contrast microscopy, differential interference contrast microscopy, have been described in the prior art, as in U.S. Pat. Nos. 2,616,334, 3,628,848, 5,751,475.

However, in the prior art, polarization light microscopy is mainly used to study birefringent character of many anisotropic sub-cellular assemblies for biological applications. Multispectral/hyperspectral imaging tools have been employed for agricultural management, but limited polarization control is applied, which potentially loses some critical information for phytological analysis.

In "Spectropolarimetric properties of vegetation." *In Polarization: Measurement, Analysis, and Remote Sensing VI* 2004 Jul. 15 (Vol. 5432, pp. 53-62). International Society for Optics and Photonics, by Goldstein and Cox, a spectropolarimetric reflectometer is described. However, the instrument uses a Fourier transform spectrometer in the illumination side. Recently, in "Imaging linear and circular polarization features in leaves with complete Mueller matrix polarimetry." *Biochimica et Biophysica Acta (BBA)—General Subjects* 1862.6 (2018): 1350-1363. Patty et al. describe a spectropolarimetric imaging system for maple leaves and cultivated maize leaves. However, the disclosed light source is a combination of a white LED source with a monochromator; the system is used in transmission, and the wavelength range is limited to 650 nm to 710 nm. The spectral measurement is achieved by scanning different wavelengths from the illumination part.

This invention discloses novel devices and methods to integrate polarimetric and spectral imaging for plants.

SUMMARY OF THE INVENTION

It is an object of this invention to combine the techniques of multispectral and hyperspectral imaging with polarimetry for plant imaging.

It is another object of this invention to evaluate the plant health and monitor plant growth not only with a stationary device, but also a portable device that can be easily deployed in the field.

It is yet another object of this invention to provide an instrument for spectropolarimetric imaging of plants, which does not necessarily need a monochromator in the illumination part.

It is yet another object of this invention to quickly diagnose fungal and fungal-like diseases of plants, such as rust, downy mildew, and leaf spot.

It is still another object of this invention to analyze spectropolarimetric data of plants with machine learning algorithms to determine different plant phenotypes and to evaluate plant health under biotic or abiotic stresses.

The present invention relates to a plant spectropolarimetric imaging device, comprising a first illuminator to direct light toward at least a portion of a plant with epi-illumination, wherein the first illuminator is broadband, covering visible and infrared spectra; a second illuminator to direct light toward at least a portion of a plant with transillumination, wherein the second illuminator is broadband, covering visible and infrared spectra; an imaging system to form images of at least a portion of a plant, wherein the imaging system comprises a polarization analyzer system; a detection system to record the images, wherein the detection system measures in a plurality of spectral channels; and a computer to display and analyze the recorded images from the detection system. Alternatively, the detection system, instead of the imaging system, comprises a polarization analyzer system.

The invention also includes a method performed by a plant spectropolarimetric imaging device, comprising directing light from at least one illuminator toward at least a portion of a plant, wherein the at least one illuminator is broadband, covering visible and infrared spectra; forming images of at least a portion of a plant with an imaging system; recording the images with a detection system, wherein the detection system measures in a plurality of spectral channels; and analyzing the recorded images with a computer, wherein the plant spectropolarimetric imaging device comprises a polarization analyzer system in the imaging system or the detection system. Further, analyzing the recorded images comprises: image preprocessing; segmentation and feature extraction; and parameter estimation and classification.

BRIEF DESCRIPTION OF THE DRAWINGS

FIG. 9(a) comprises four different linear analyzers: 0°, 45°, 90° and 135° linear analyzers. FIG. 9(b) comprises two linear analyzers (0° and 90°), and two circular analyzers, i.e. a right-hand circular analyzer and a left-hand circular analyzer. FIG. 9(c) comprises two linear analyzers (45° and 135°), and two circular analyzers (a right-hand circular analyzer and a left-hand circular analyzer). FIG. 9(d) comprises three linear analyzers (30°, 90°, and 150°), and one circular analyzer. FIG. 9(e) presents a circular polarizer, used here as a linear analyzer, with the linear polarizer facing toward the incident light. FIG. 9(f) presents a circular analyzer, with the quarter-wave plate facing toward the incident light.

FIG. 17(a) represents both the true optical interface and the abstracted optical interface of each layer, referred to as the "generalized optical interface" (GOI). FIG. 17(b) represents the reflection and transmission at the first two generalized optical interfaces, which are the interface 0 and the inner plane 1. FIG. 17(c) presents the generalized iterative analysis at the m-th and (m+1)-th GOI.

DETAILED DESCRIPTION OF THE INVENTION

Figure 1:
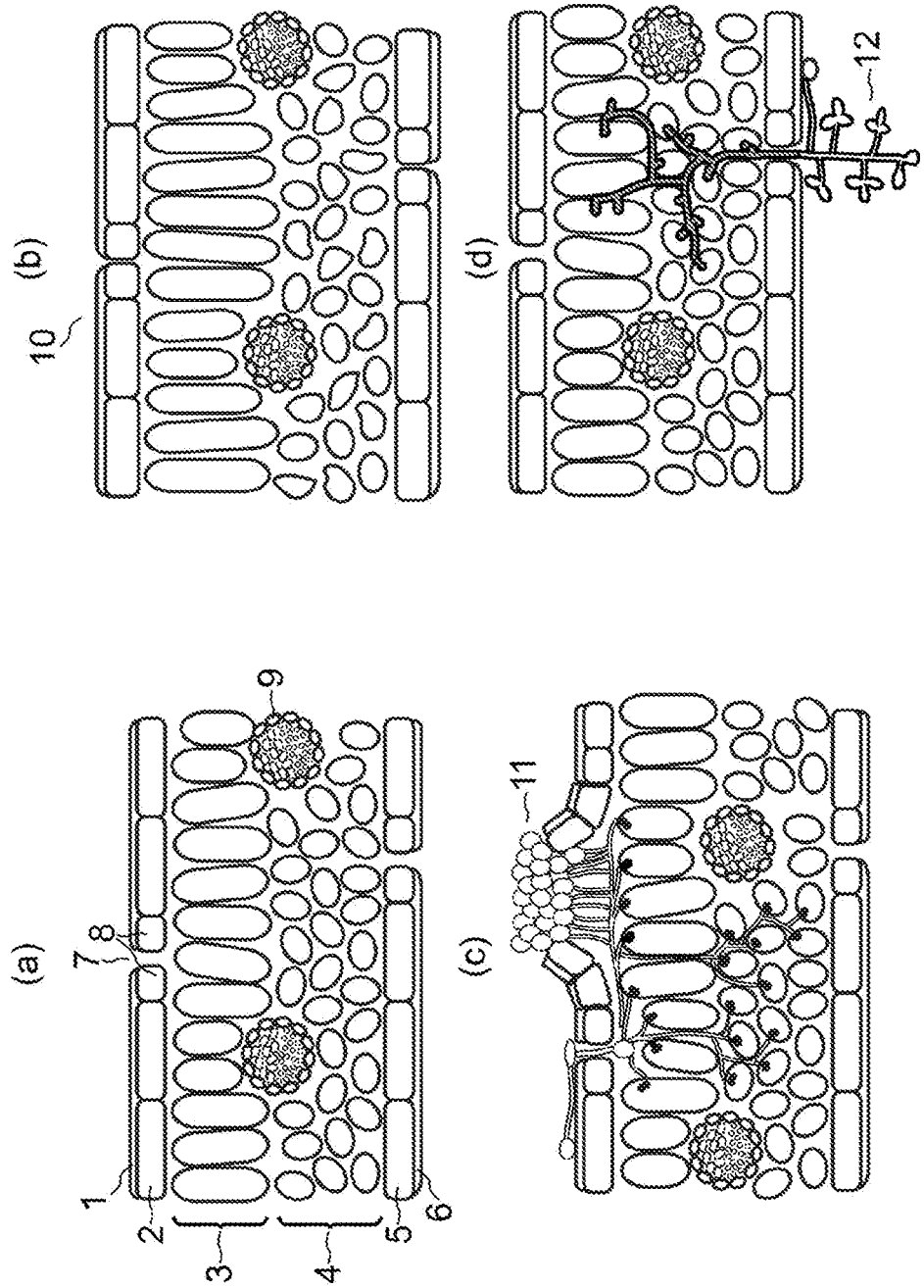
FIG. 1 illustrates the microscopic structures of a healthy leaf in FIG. 1(a), a leaf under water stress in FIG. 1(b), a leaf infected with rust in FIG. 1(c), and a leaf with downy mildew in FIG. 1(d).

FIG. 1 illustrates the schematic microscopic structures of healthy and stressed leaves. FIG. 1(a) is a healthy leaf, the upper epidermis 2 is covered by a cuticle 1, which is a protective layer. The palisade mesophyll 3 and the spongy mesophyll 4 are located beneath the upper epidermis 2 but above the lower epidermis 5, and the mesophyll tissues are rich in chloroplasts. Another cuticle 6 covers the lower epidermis. The stoma 7 is surrounded by guard cells 8, and a vascular bundle 9 is a part of the transport system of the plant. The outermost part of the cuticle is a wax layer, with a thickness usually of micron-level up to mm-level. The cuticular wax layer could range from amorphous to crystalline, and the reflection at the cuticle-air interface is the dominant contributor to the specular reflection off a leaf surface. The underlying leaf structures contribute more to scattering and absorption. FIG. 1(b) shows the structure of a water-stressed leaf 10, which usually tends to be thicker than a normal leaf, and the thickness of both the palisade and spongy parenchyma layers could increase. FIG. 1(c) illustrates the structure of a leaf infected by rust 11, and FIG. 1(d) presents the structure of a leaf infected by downy mildew 12.

Figure 2:
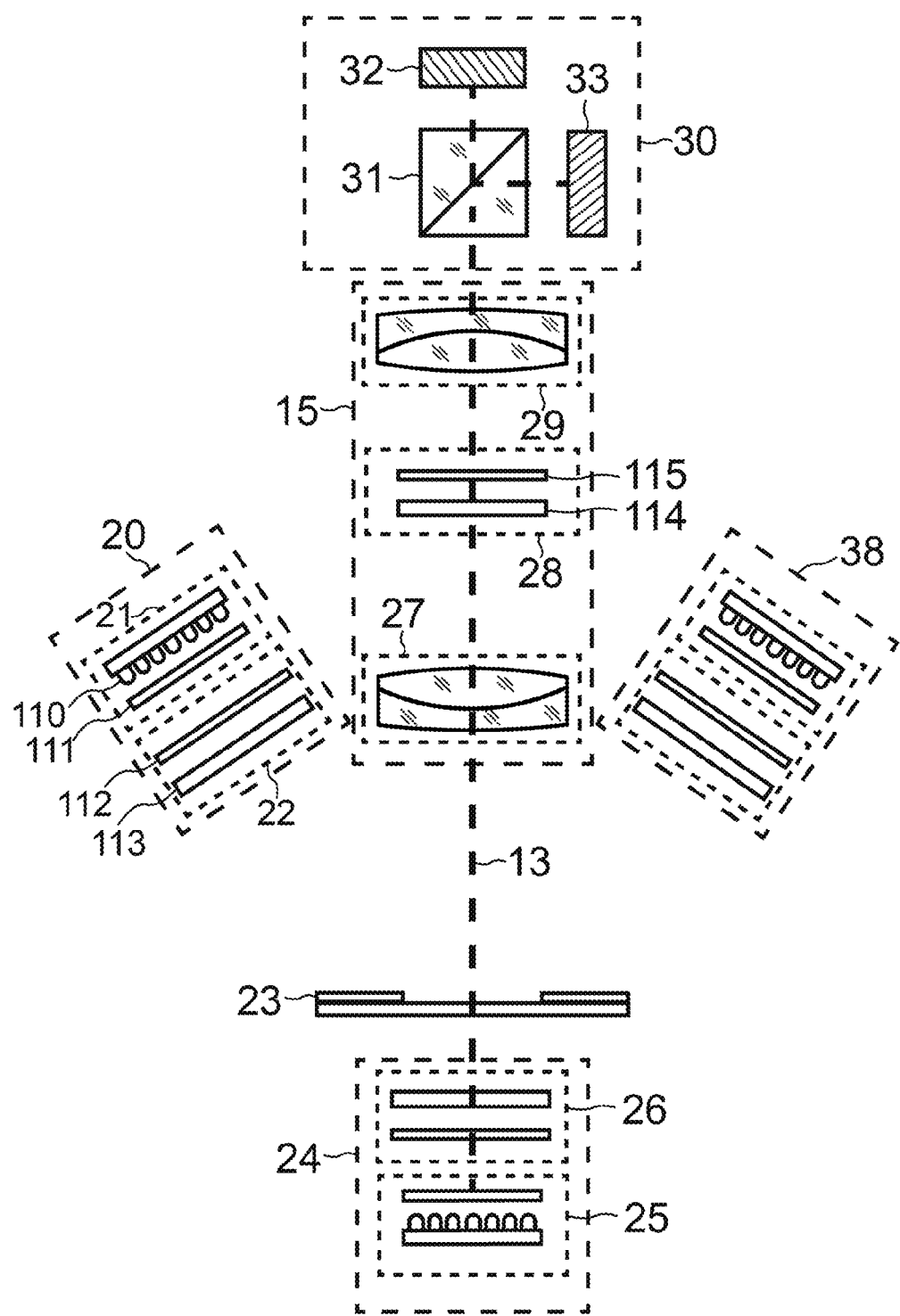
FIG. 2 presents Embodiment 1 of the device for plant spectropolarimetric imaging with both epi-illumination and transillumination.

FIG. 2 presents one embodiment, Embodiment 1, of the disclosed device for plant spectropolarimetric imaging. A first illuminator 20 directs light from a first light source 21 through a first polarization generator system 22. Preferably, the first light source 21 is a broadband light source, covering both visible and near infrared. Larger wavelength ranges, including ultraviolet (UV), short wave infrared (SWIR), mid-infrared infrared (MWIR), and long-wave infrared (LWIR), are also possible for the first light source 21. In one preferred embodiment, the first light source 21 comprises an array of light-emitting diodes (LEDs) 110, and a translucent optical diffusing structure 111 to distribute the output light more uniformly. The embodiment of the first light source could also comprise other light sources, such as tungsten-halogen lamps, mercury lamps, xenon lamps, metal halide lamps, liquid-crystal displays (LCDs), organic light-emitting diodes (OLEDs), superluminescent diodes (SLDs), supercontinuum lasers, and a combination of multiple lasers (preferably aligned coaxially with beamsplitters), etc. In some embodiments of the light source, a spherical or conical reflecting mirror is integrated in the lamphouse to improve the directionality of the light source. In one embodiment, the diffusing structure 111 comprises one layer or a plurality of spaced layers of translucent materials. In another embodiment, the diffusing structure comprises one layer or a plurality of spaced layers of holographic diffusers. Further, in one embodiment, the first illuminator comprises two symmetrical groups 20 and 38 to illuminate the sample from two directions, with 38 being symmetric to 20 with respect to the optical axis 13, as shown in FIG. 2. Note that the addition of the symmetric group 38 as part of the first illuminator is optional. In some other embodiments, the first illuminator has the overall shape of a conical frustum, with four or even more individual illumination subgroups.

One preferred embodiment of the first polarization generator system 22 comprises a linear polarizer 112 and a rotating retarder 113, as presented in FIG. 2. Preferably, the rotating retarder 113 is a rotating achromatic (broadband) quarter-wave plate. In some other embodiments, the first polarization generator system could alternatively comprise a linear polarizer, a circular polarizer, an elliptical polarizer, a rotating linear polarizer, a linear polarizer and two variable retarders, where the fast axes of the two variable retarders are orientated 45° to each other, and the embodiments of variable retarders could be, for example, liquid crystal variable retarders (LCVR), or a pair of Babinet-Soleil compensators, or a pair of photoelastic modulators (PEMs), or electro-optical modulators (ex. Pockels cells), or magneto-optical modulators. The first polarization generator system could also be a linear polarizer and a ferroelectric liquid crystal (FLC) retarder, which has a switchable axis orientation, or a combination of a linear polarizer, a rotating quarter-wave retarder and a rotating half-wave retarder. If only rudimentary measurements of degree of linear polarization is required, the first polarization generator system could simply be a rotating linear polarizer. In some embodiments, the first polarization generator system in both directions could be displaced out of the optical path of the two symmetrical flat panel groups.

After emitting from the first light source 21 and passing through the first polarization generator system 22, the polarized light exits the first illuminator 20 and reaches a sample (not shown) placed on the sample stage 23, which constitutes the epi-illumination of the device of this invention. Preferably, the sample is being secured by clips or fasteners, and if the sample is a leaf, it could be held flat and stable. In some embodiments, the sample stage could be rotated with respect to the main optical axis 13. This rotation of the sample stage could apply to all the other embodiments hereinafter.

In some embodiments, the first illuminator 20 could rotate with respect to the main optical axis 13 of the system, to adjust the azimuthal angle of illumination. In another embodiment, the first illuminator symmetric groups 20 and 38 could be rotated together with respect to the main optical axis 13. This azimuthal rotation of the illuminator could apply to all the other embodiments hereinafter.

Further, in one preferred embodiment of the first illuminator 20, the illumination angles with respect to the surface normal of the plant sample stage, or the polar angle of the illuminator, could be adjusted with a rotatable arm. Hence, it's possible to achieve a large range of incident angles, including relatively large incident angles. Preferably the incident angle could range from 20° to 85°. At relatively large incident angles around 45° to 85°, the potential glares of near-specular reflection from the reflective cuticles of some plant samples could be reduced or even minimized, while some pathogen features, such as the mycelia or the hyphae of infected fungal or fungal-like microbes, could be clearly imaged due to stronger scattering.

Hence, in some preferred embodiments, the first illuminator and the second illuminator are positioned such that both the azimuthal angle and the polar angle of each illuminator are adjustable. The position is chosen according to measurement requirements.

A second illuminator 24 illuminates the sample stage 23 from the opposite side (for example, beneath the sample). The second illuminator 24 comprises a second light source 25 and a second polarization generator system 26. The sample stage 23 has a transparent window, preferably made of non-birefringent glass, which allows light from 24 to pass through the stage to reach the sample, and the transparent window for illumination could be of a circular or square shape. This setup with the second illuminator 24 constitutes the transillumination of the device. In a preferred embodiment, the second illuminator 24 comprises similar components as the first illuminator 20. Similar to the first light source 21, the second light source 25 is a broadband light source, covering both visible and infrared. The infrared spectrum could include near infrared (NIR), short wave infrared (SWIR), mid-wave infrared (MWIR), and long-wave infrared (LWIR). The light source also could cover a larger wavelength range, including ultraviolet (UV). The embodiment of the second polarization generator system could be any of the disclosed embodiments of the first polarization generator system.

In FIG. 2, a sample could rest horizontally on the sample stage with the epi-illumination from the above and transillumination from the below, yet it's critical to point out that the drawing does not necessarily indicate an upright orientation. For example, the whole setup could be laid out in a horizontal bench, with the sample stage vertically oriented. A sample, such as a plant leaf, could be fixated with clips or other fasteners to maintain a vertical orientation with regards to the underlying bench. This flexibility of the device orientation could also be extended for all the other embodiments hereinafter.

In some embodiments, the first and/or the second illuminator could further comprise a beam shaping group (not shown in FIG. 2). This beam shaping group could be especially useful to provide relatively even illumination for non-flat samples, such as a quasi-cylindrical stem of a plant. The optional beam shaping group of the illuminator could apply to all the other embodiments hereinafter.

Furthermore, in some embodiments, the first or the second illuminator, or both illuminators could comprise a tunable narrow band filter or a dispersive optical element to adjust the illumination spectrum, and the illuminator may function as a monochromator. At any moment, the illumination spectrum is of limited wavelength range, but the illumination spectrum could step through a wide range of wavelengths to generate broadband illumination with time.

Moreover, in some embodiments, the first or the second illuminator, or both illuminators could comprise a Fourier transform spectrometer. A polarization generator system could be added after the Fourier transform spectrometer or it could be integrated within the Fourier transform spectrometer.

A plant sample (not shown in FIG. 2) is placed on the sample stage 23. In order to analyze the plant sample from different perspectives, preferably, epi-illumination and transillumination of the device is used one at a time. Further, the plant sample under evaluation could be flipped upside down for a full investigation.

Reflected light with epi-illumination or transmitted light with transillumination is directed to go through an imaging system 15. In one preferred embodiment as shown in FIG. 2, the imaging system 15 comprises an objective group 27, a polarization analyzer system 28, and a focusing group 29. In FIG. 2, the objective group 27 and focusing group 29 are lens groups. However, in some other embodiments, the objective group and focusing group could be mirror groups, or catadioptric groups. More preferably, light is collimated after the objective group 27. Light continues to pass through the polarization analyzer system 28. One preferred embodiment of the polarization analyzer system 28 comprises a rotating retarder 114, and a linear polarizer 115. Similar to the polarization generator system but usually with optical elements positioned in reversed sequence, the polarization analyzer system could comprise, for example, a linear analyzer, a circular analyzer, an elliptical analyzer, a rotating linear analyzer, a combination of a rotating retarder and a linear analyzer, (such as a rotating achromatic/broadband quarter-wave plate and a linear analyzer), or a combination of two variable retarders orientated at 45° to each other and a linear analyzer, or a combination of a rotating half-wave retarder, a rotating quarter-wave retarder, and a linear analyzer. The polarization analyzer system could also be a ferroelectric liquid crystal (FLC) retarder and a linear analyzer, where the FLC retarder has a switchable axis orientation. Other embodiments of the polarization analyzer system could also use photoelastic modulators (PEMs) or electro-optical modulators, magneto-optical modulators, etc. In another embodiment of the polarization analyzer system, a combination of a waveplate and a polarizing beamsplitter could be used, and a polarizing beamsplitter such as a Wollaston prism is preferably used along with a (rotating or stationary) waveplate, to split light of different polarizations onto different detectors or different regions of a single detector.

Further, in some embodiments, both the polarization generator system 22 and the polarization analyzer system 28 could be displaced out of the optical path, so that the images with and without polarization control could be compared and analyzed.

Note that the disclosed embodiments of the polarization generator system and the polarization analyzer system could also be applied to other embodiments described hereinafter.

After the imaging system 15, light reaches a detection system 30. FIG. 2 presents one preferred embodiment of the detection system 30, which includes a dichroic beamsplitter 31, a first detector 32 sensitive to the visible spectrum, and a second detector 33 sensitive to the infrared spectrum. In one embodiment, the visible detector 32 has red, green, and blue (RGB) three color channels, and the infrared detector 33 has one monochromatic infrared channel. The infrared detector 33 could have more spectral channels to further distinguish different infrared spectral bands. The detection system could also have more dichroic beamsplitters or other dispersive elements and matching detectors to operate in ultraviolet, visible, near-infrared, short-wave infrared, mid-wave infrared and long-wave infrared.

In some other embodiments, the detection system could comprise at least one spectral splitting optical element, which could be at least one dichroic beamsplitter, at least one tunable filter, and at least one grating, etc. If a tunable filter is used, it could be, for example, a liquid crystal tunable filter, an acousto-optic tunable filter, or a rotating wheel with narrow band spectral filters.

For some plant samples, for example, a curly leave or a quasi-cylindrical stem, an enlarged depth of field might be required. Preferably, the positions of the objective group 27 and the focusing group 29 could be adjusted to fine-tune the focal plane location. In a preferred embodiment, the imaging system 15, or the detection system 30, or the sample stage 23 could be adjusted axially so that a depth scan along the optical axis 13 direction within a certain range is possible, which is critical for a convenient and accurate examination of a non-flat sample. An image fusion algorithm could be used to generate a fused image with optimal image quality by combining a series of multi-focus images.

With the disclosed configurations, not only spatial and spectral information, but also the polarimetric information of the plant sample could be characterized. Generally, the more polarization states of the polarizer-analyzer pair are required, the longer the image capturing time will be.

Figure 3:
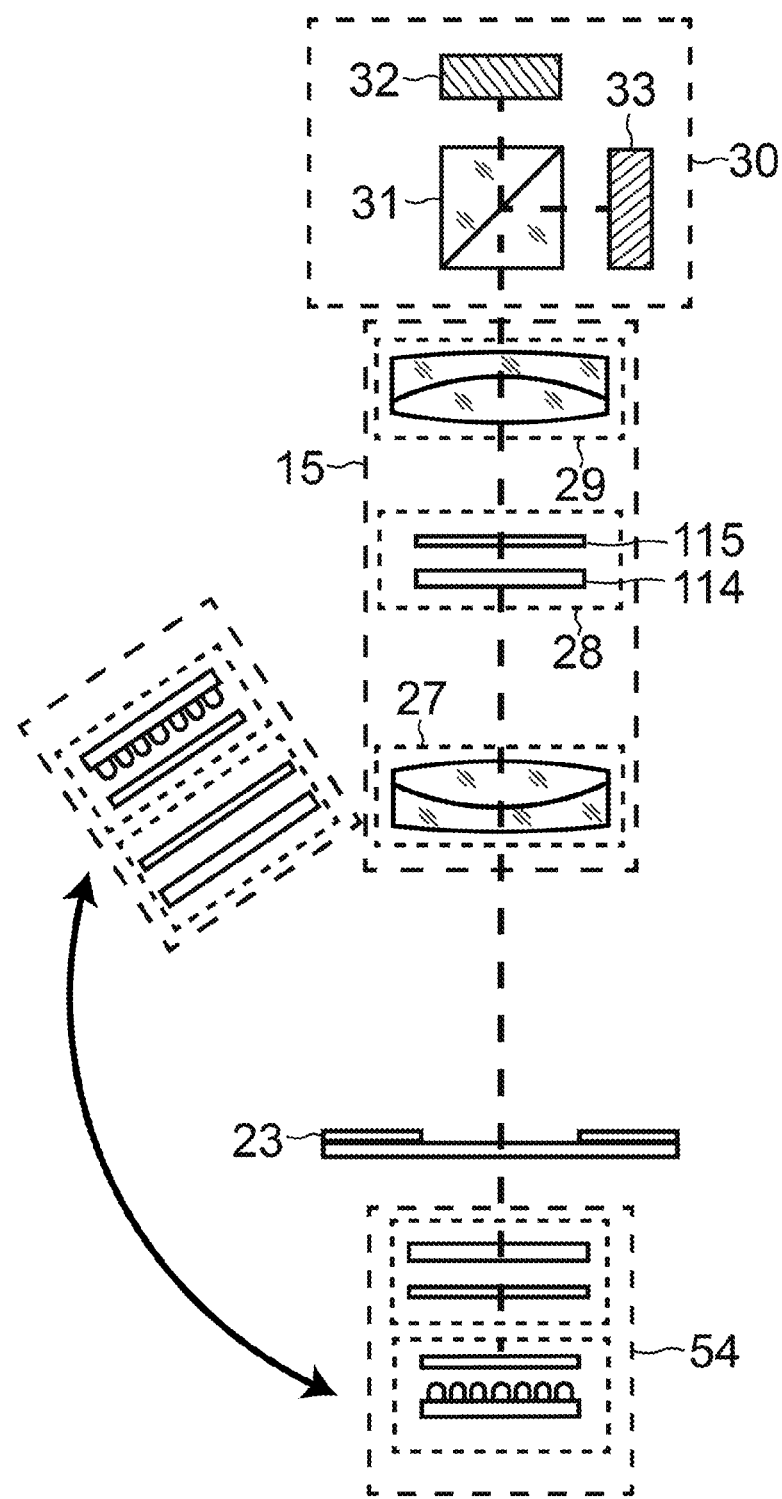
FIG. 3 presents Embodiment 2 of the device for plant spectropolarimetric imaging with only one rotatable illuminator to achieve both epi-illumination and transillumination.

FIG. 3 presents another embodiment, Embodiment 2 of the disclosed device, where only one rotatable illuminator is needed to achieve both epi-illumination and transillumination. The overall setup is similar to that of FIG. 2, yet without the optional symmetric illuminator group 38. The position of an illuminator 54 could be rotated, and after rotation, its pointing direction could be further adjusted. The illuminator 54 could be placed at the position of the original first illuminator 20 or rotated to the position of the original second illuminator 24 previously shown in FIG. 2; hence one illuminator set is enough for both epi-illumination and transillumination. Essentially, the polar angle of the illuminator is adjusted from less than 90° to larger than 90°, so that the illuminator is positioned for epi-illumination in a first position and after image series recording, the illuminator is repositioned for transillumination in a second position, so that the device could record another image series, and these image series could be analyzed afterwards.

However, it should be noted the adjustment of the illumination direction and the subsequent alignment might take some time, and further affect measurements repeatability and accuracy. This is a trade-off compared to having two illuminators simultaneously. This single rotatable illuminator setup for both epi-illumination and transillumination applies to all the other embodiments disclosed in this patent hereinafter.

Figure 4:
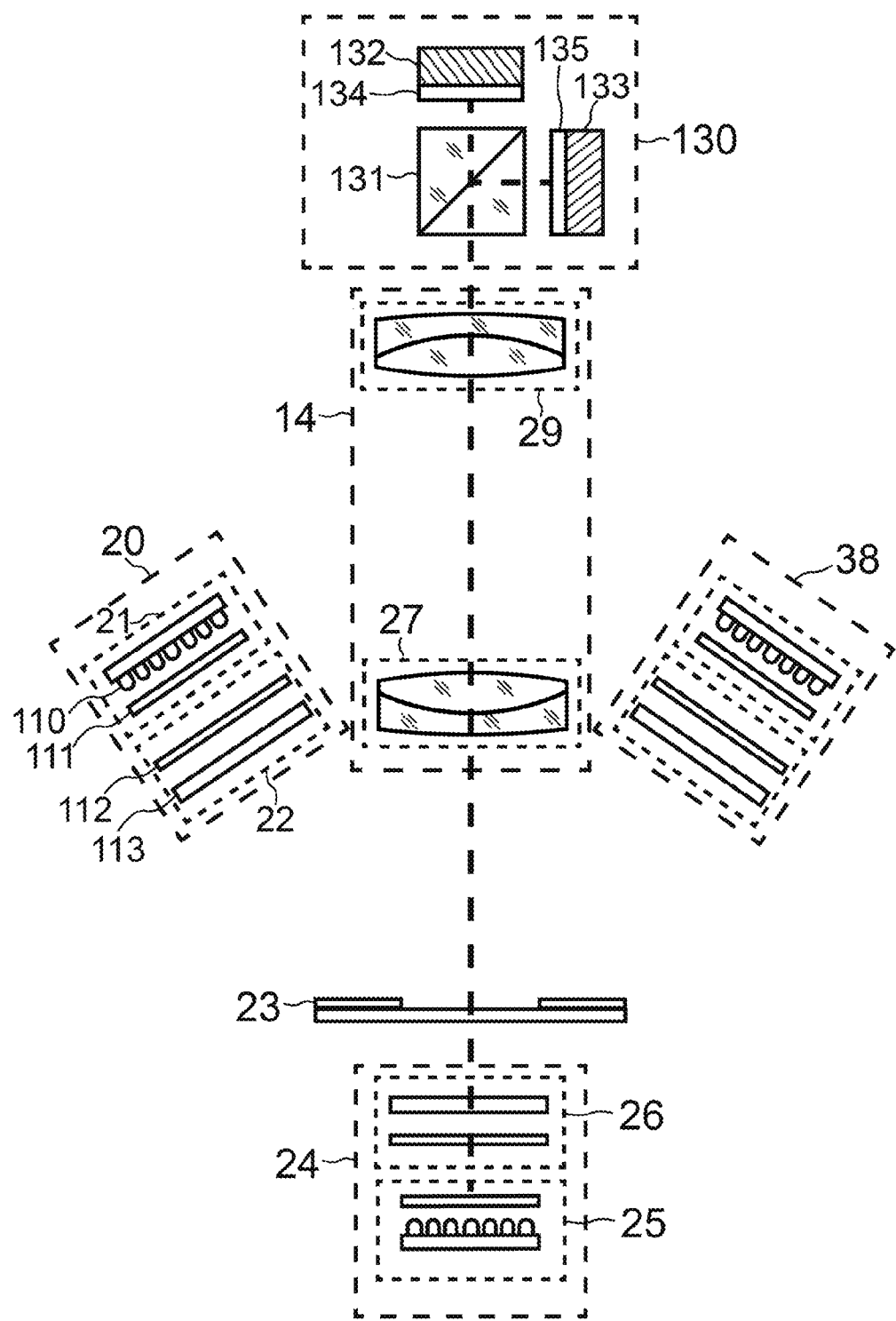
FIG. 4 presents Embodiment 3 of the plant spectropolarimetric imaging device, where the polarization analyzer system is integrated in the detection system.

FIG. 4 presents another embodiment, Embodiment 3 of the disclosed device, where the polarization analyzer system is integrated in the detection system, instead of being in the imaging system as in FIG. 2. The imaging system 14 in FIG. 4 is similar to the imaging system 15 in FIG. 2, potentially with some necessary optical path adjustments. The geometric setup of the detection system 130 is similar to that of the detection system 30 in FIG. 2. 130 includes a dichroic beamsplitter 131, a first detector 132 sensitive to the visible spectrum, and a second detector 133 sensitive to the infrared spectrum. The visible detector 132 has red, green, and blue (RGB) three color channels, and the infrared detector 133 has one or more infrared channels. However, the detectors in 130 each comprises a polarization sensitive layer, such as a micropolarizer layer. A polarization sensitive layer 134 is integrated on the first detector 132, and another polarization sensitive layer 135 is integrated on the second detector 133. Hence the polarization analyzer system is fabricated on chip in the detection system, and a plurality of analyzers in a polarization sensitive layer are integrated in the detection system. If the polarization sensitive layer is a micropolarizer layer, it could be composed of sub-wavelength metal gratings, iodide-doped polyvinyl alcohol-based micropolarizer arrays, and liquid crystals micropolarizer arrays, etc. One type of the polarization analyzer system integrated on chip comprises four adjacent pixels with 0°, 45°, 90°, and 135° four different polarization orientation, and these adjacent two by two pixels form a unit cell for polarization analysis. One embodiment of this type of polarization image sensor to work in the visible and near infrared spectra is the Sony IMX250MZR/MYR sensor or Sony IMX253MZR/MYR sensor. These Sony polarization image sensors have four different directional linear analyzers. By comparing and combining the images from different linear analyzers in each frame, the polarization information could be used to reveal phytological properties. This type of linear polarizer micropolarizer sensor could only measure the first three components $[S_0, S_1, S_2]^T$ of the Stokes vector of the output beam (The superscript "T" stands for "transpose"), and the circular polarization information is lost. If the full Stokes vector ($[S_0, S_1, S_2, S_3]^T$) analysis of the output beam is necessary, a combination of micropolarizer and micro-retarder based polarization image sensors could be used as the polarization sensitive layer. Alternatively, dielectric metasurfaces could be used for full-Stokes vector analysis of the output beam. If the polarization states in the illumination are properly controlled, a full Mueller matrix analysis of the plant sample at each spectral channel could be achieved.

Figure 5:
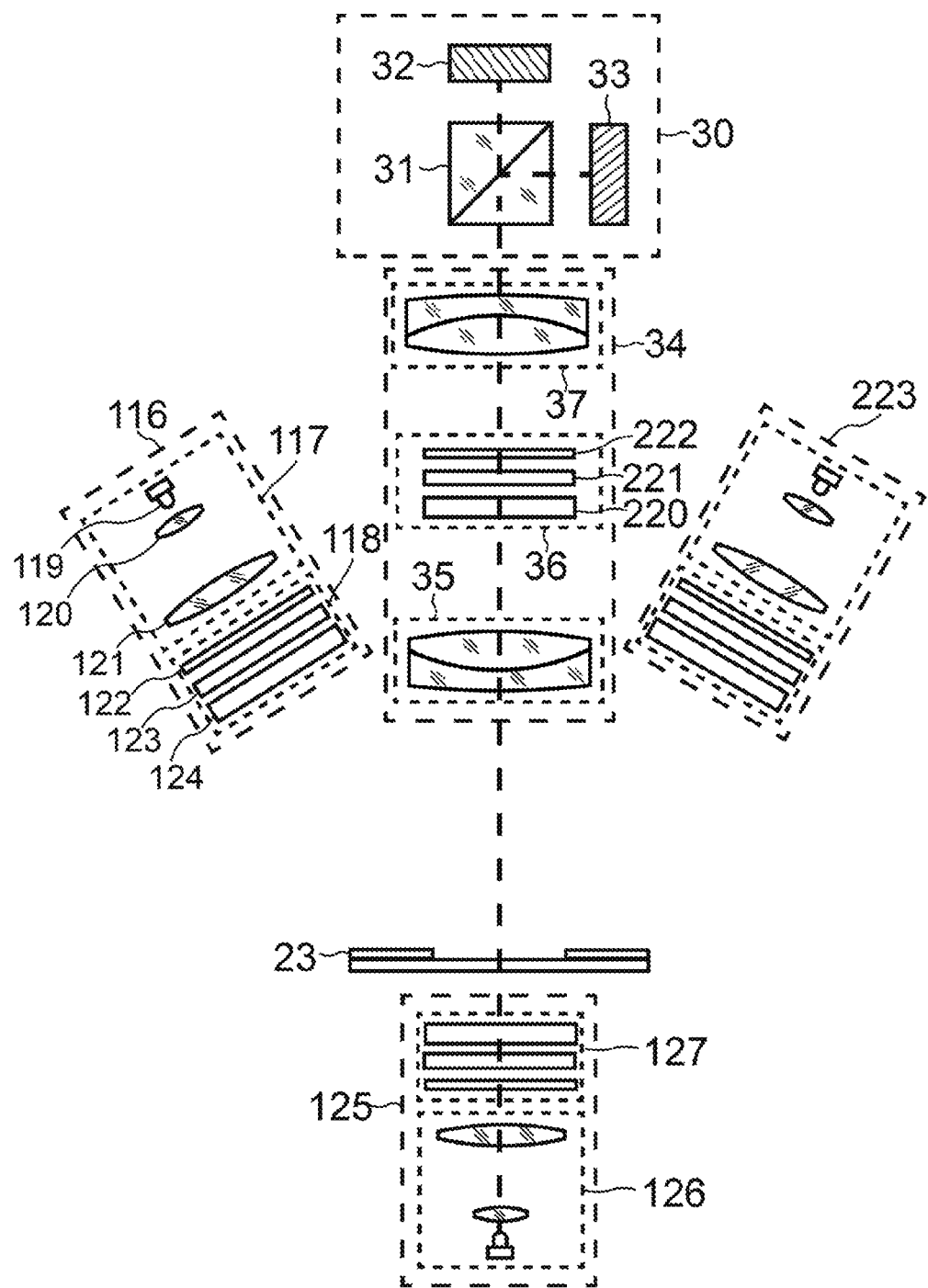
FIG. 5 presents Embodiment 4 of the plant spectropolarimetric imaging device, where the first illuminator, the second illuminator, and the imaging system are reconfigured.

FIG. 5 illustrates another embodiment, Embodiment 4 of the disclosed device, where the first illuminator, the second illuminator, and the imaging system are reconfigured. The first illuminator 116 directs light from a first light source 117 through a first polarization generator system 118 to reach a plant sample (not shown) at a sample stage 23. In one preferred embodiment of the first light source 117 as shown in FIG. 5, it comprises one broadband light source 119, an illuminator condenser lens 120, and an illuminator collimation lens 121. One preferred embodiment of the broadband light source 119 is a single high radiant output light-emitting diode (LED) or an array of LEDs, such as the Thorlabs MBB1L3 mounted broadband LED. The broadband light source 119 could also comprise an array of LEDs with different spectral output such that the total spectral output is broadband. Similar to FIG. 2, the embodiment of the broadband light source could also comprise other light sources, such as tungsten-halogen lamps, mercury lamps, xenon lamps, metal halide, liquid-crystal displays (LCDs), organic light-emitting diodes (OLEDs), superluminescent diodes (SLDs), supercontinuum lasers, and a combination of multiple lasers (preferably aligned coaxially with beamsplitters), etc. In some embodiments of these light sources, a spherical or conical reflecting mirror could be integrated in the lamphouse to improve the directionality of the light source. Further, one embodiment of the illuminator condenser lens 120 is a molded aspheric condenser lens, and preferably the light output after the illuminator collimation lens 121 is collimated or quasi-collimated. In some embodiments, there is a spatial filter (not shown) in between 120 and 121, at the front focal plane of 121, such that the collimation of the beam after 121 could be improved. The first polarization generator system 118 comprises a linear polarizer 122, a first variable retarder 123, and a second variable retarder 124. The fast axes of 123 and 124 are oriented at 45° to each other. The variable retarders could be, for example, liquid crystal variable retarders (LCVR), or Babinet-Soleil compensators, or photoelastic modulators (PEMs), or electro-optical modulators, or magneto-optical modulators. If LCVRs are used, the birefringence of the LCVRs could be electronically adjusted by varying the voltage across the liquid crystals. Similar to the case in FIG. 2, the first illuminator could further comprise an optional symmetric group 223, with 116 and 223 being symmetric with respect to the main optical axis of the system. Similar to the first illuminator 116, the second illuminator 125 comprises a second light source 126 and a second polarization generator system 127. Preferably, the illuminators could adjust the illumination angles with respect to the surface normal of the plant sample stage with a rotatable arm to achieve a large range of incident angles, and both the polar angle and the azimuthal angle of the illuminators could be adjusted.

The imaging system 34 in FIG. 5 comprises an objective group 35, a polarization analyzer system 36, and a focusing group 37. Preferably, light is collimated after the objective group 35. One preferred embodiment of the polarization analyzer system 36 comprises a variable retarder 220, another variable retarder 221 and a linear analyzer 222. The fast axes of 220 and 221 are 45° to each other. The polarization analyzer system 36 is similar to the polarization generator system 118 but usually with optical elements positioned in reversed sequence as in 118. Alternatively, the polarization analyzer system 36 could also be any other previously disclosed embodiments of the polarization analyzer system. The detection system 30 in FIG. 5 is similar to that in FIG. 2.

The main advantage of the embodiment in FIG. 5 is that there are no mechanically moving parts when adjusting polarization setups. The variable retarders could be adjusted electronically, which generally tends to be much faster and more robust with a more relaxed alignment requirement, compared to mechanically adjusted polarization components, such as a rotating polarizer or a rotating retarder. Beam wander caused by the rotating polarization elements with a residual wedge is avoided in this embodiment.

Similar to 20 in FIG. 2, the first illuminator 116 in FIG. 5 could adjust the illumination angles with respect to the surface normal of the plant sample stage with a rotatable arm. Hence, it's possible to achieve a large range of incident angles. Preferably the incident angle could range from 20° to 85°, and both the polar angle and the azimuthal angle of the illuminators could be adjusted.

Figure 6:
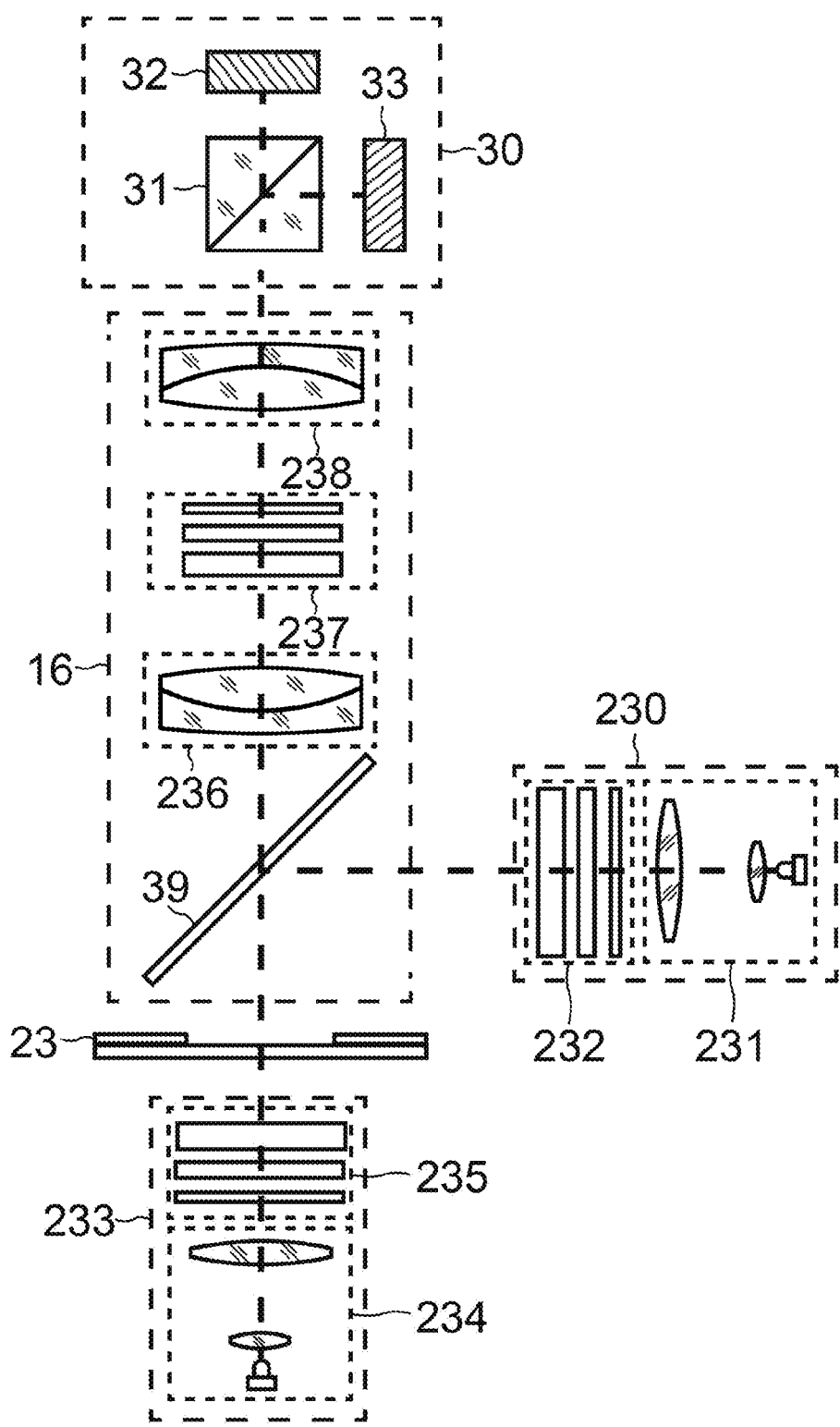
FIG. 6 presents Embodiment 5 of the plant spectropolarimetric imaging device, where the epi-illumination setup is rearranged.

FIG. 6 presents another embodiment, Embodiment 5 of the disclosed device, where the epi-illumination setup is rearranged, compared with Embodiment 4 in FIG. 5. A first illuminator 230 comprises a first light source 231 and a first polarization generator system 232. Preferably, the light output from the first light source 231 is collimated or quasi-collimated. The polarization generator system 232 is similar to 118 in FIG. 5, which could comprise a linear polarizer and two variable retarders (such as LCVRs) with fast axes oriented at 45° to each other. All other disclosed embodiments of the polarization generator system 118 could also apply to 232, and in some embodiments, it could be displaced out of the optical path. A non-polarizing beamsplitter 39 directs light to reach a sample (not shown) on the sample stage 23. The reflected light from the sample is collected via an imaging system 16. In a preferred embodiment as shown in FIG. 6, the imaging system 16 comprises the non-polarizing beamsplitter 39, an objective group 236, a polarization analyzer system 237, and a focusing group 238. The polarization analyzer system 237 is similar to 36 in FIG. 5, which could comprise two variable retarders (such as LCVRs) with fast axes mutually oriented at 45°, and a linear analyzer. All other disclosed embodiments of the polarization analyzer system 36 could also apply to 237, which could be embodiments of 118 in FIG. 5 in reverse order. In some embodiments, the polarization analyzer system 237 could be displaced out of the optical path. The objective group 236 and the focusing group 238 in FIG. 6 are lens groups, but they could also be mirror groups or catadioptric groups in some other embodiments. A second illuminator 233 in the transillumination system is similar to 125 in FIG. 5, and 233 comprises a second light source 234 and a second polarization generator system 235. After the imaging system 16, light reaches a detection system 30, which is similar to the detection system in FIG. 2.

In another embodiment, the non-polarizing beamsplitter 39 in FIG. 6 could be a holed mirror with an annular shape. The annular mirror is part of the illumination pathway, and the aperture in the center of the holed mirror is part of the imaging pathway. The aperture of this holed mirror is matched with the aperture stop and vignetting requirements of the rest of the optical system.

Figure 7:
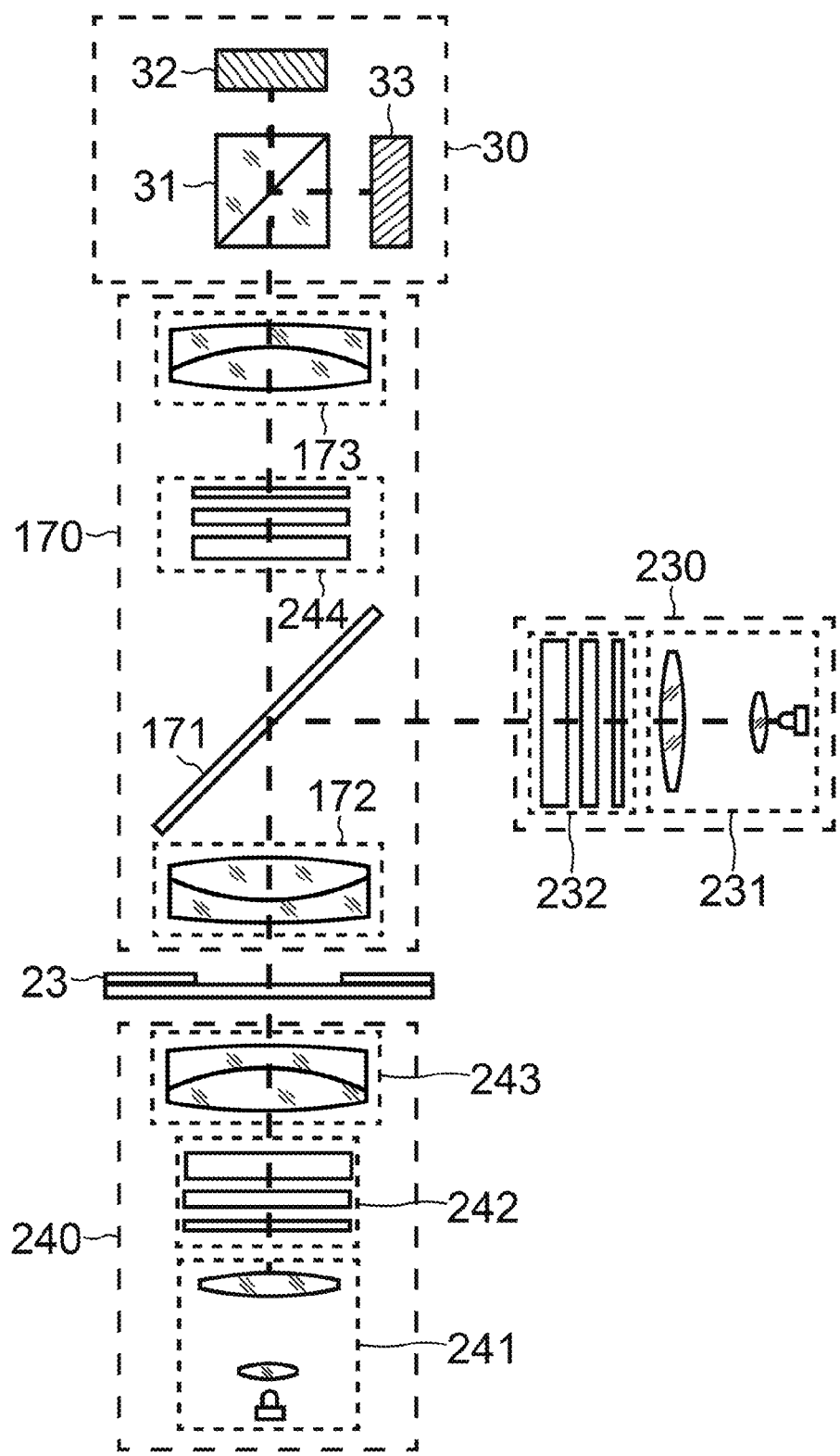
FIG. 7 presents Embodiment 6 of the plant spectropolarimetric imaging device, where a microscope objective lens group is used.

FIG. 7 presents another embodiment, Embodiment 6 of the disclosed device, where a microscope objective lens group is used, so that a small area of a sample could be examined with high magnification and high resolution. The first illuminator 230 in FIG. 7 is the same as that in FIG. 6 to provide epi-illumination. A non-polarizing beamsplitter 171 directs light toward a microscope objective lens group 172, which focuses the illumination light onto a sample (not shown) on the sample stage 23. In one embodiment, the sample stage 23 could be adjusted along the stage plane in two orthogonal directions, such that a larger field of view could be achieved by image stitching of a sequence of measurements. The reflected light from the sample is collected by the microscope objective lens group 172 and becomes collimated before it passes through the non-polarizing beamsplitter 171 and a polarization analyzer system 244. Similar to 39 in FIG. 6, the non-polarizing beamsplitter 171 in FIG. 7 could be also be an annular holed mirror in some embodiments. A focusing lens group 173 directs light to form images onto a detection system 30, which is similar to that in FIG. 2. A second illuminator 240 in the transillumination system in FIG. 7 comprises a second light source 241, a second polarization generator system 242, and a microscope objective lens group 243. Preferably, the microscope objective lens groups 172 and 243 are substantially symmetric with respect to the object plane of the sample. In a preferred embodiment, the first illuminator 230, the microscope objective lens groups 172 and the rest of the device are arranged such that Kohler illumination is achieved.

The plant sample in FIG. 7 has a more restricted size limit, usually it has to be a thin leaf or a prepared slice sample. The field of view is usually smaller compared with that in FIG. 6. However, a higher magnification and a higher resolution could be achieved with the addition of the microscope objective lens group. Even though, in some embodiments, sequential measurements by displacing the sample stage along the stage plane could help increase the final field of view by image stitching, it tends to take longer time to measure.

Figure 8:
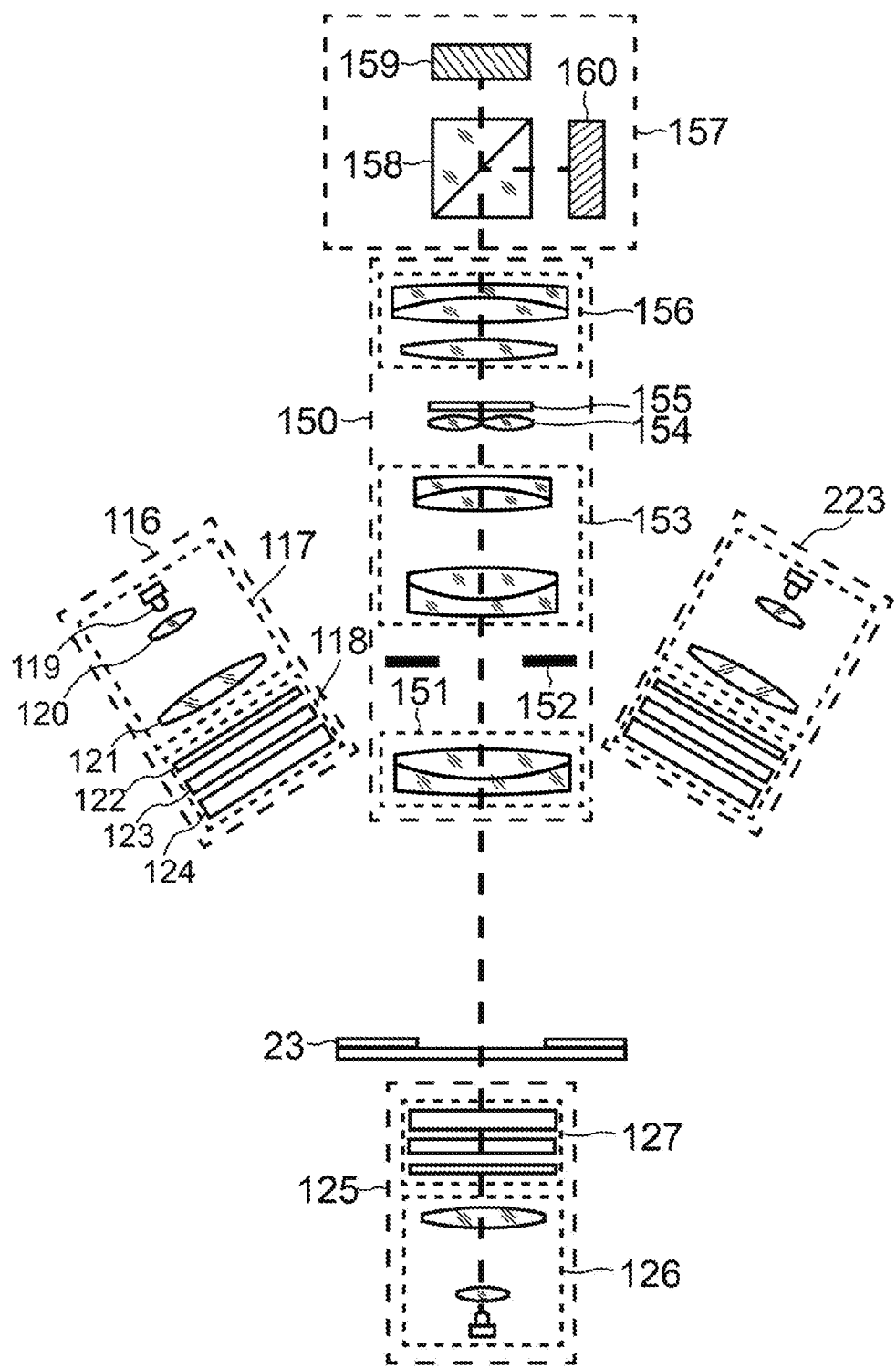
FIG. 8 presents Embodiment 7 of the plant spectropolarimetric imaging device, where a division of aperture polarimetric system is used.

FIG. 8 presents another embodiment, Embodiment 7 of the disclosed device, where a division of aperture polarimetric system is used. The illuminators in FIG. 8 are similar to those in FIG. 5, and all the previously disclosed embodiments of the illuminator could also be employed. The imaging system 150 comprises an objective lens group 151, a field stop 152, a collimation lens group 153, a 2×2 sub-aperture lens array 154, a 2×2 analyzer array 155, and a focusing lens group 156. The field stop 152 is conjugate to both the object plane and the image plane, and it is used to limit the field coverage such that there is no overlap of images on the detector focal plane from different field points through adjacent sub-aperture lenses in 154. The collimation lens group 153 projects the entrance pupil of the objective lens group 151 onto the sub-aperture lens array 154. Also, the ray bundle from each field point is collimated or approximately collimated after the collimation lens group 153. The lens array 154 evenly divides the aperture into four sub-apertures with different polarization analyzers in the analyzer array 155. The analyzer array 155 functions as the polarization analyzer system. The focusing lens group 156 is used to form images on a detector system 157. The detection system 157 is similar to the detection system 30 in FIG. 2. The detection system 157 includes a dichroic beamsplitter 158, a first detector 159 sensitive to the visible spectrum, and a second detector 160 sensitive to the infrared spectrum.

Sometimes, there is some residual misalignment of the images formed by each sub-aperture, and digital registration is usually done to reduce pixel misalignment error. Digital registration is usually based on calibration data of known objects. Alternatively, it could also be done based on the overlap of images from sub-apertures through convolution or similar algorithms.

Figure 9:
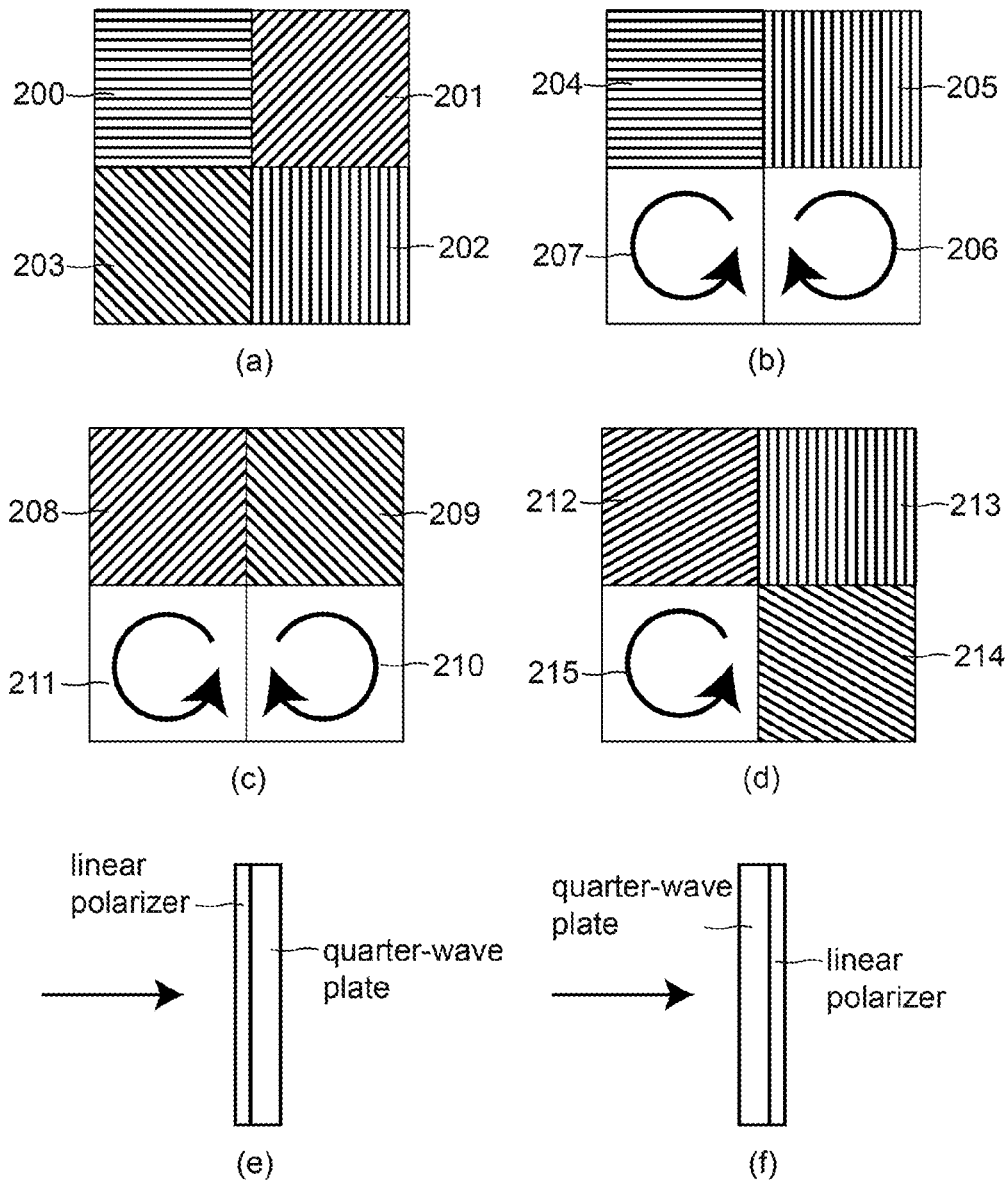
FIG. 9 presents four different embodiments of a 2×2 analyzer array.

FIG. 9 presents four different embodiments of the 2×2 analyzer array 155. FIG. 9(a) presents a 2×2 analyzer array, which comprises four different linear analyzers in the four sub-apertures, including a horizontal (0°) linear analyzer

200, a 45° linear analyzer 201, a vertical (90°) linear analyzer 202, and a 135° linear analyzer 203. These sub-aperture analyzers could be composed of sub-wavelength metal gratings, iodide-doped polyvinyl alcohol-based micropolarizer arrays, liquid crystals micropolarizer arrays, and dielectric metasurfaces, etc. Note that the linear orientation in FIG. 9 is only representative to the direction along which the polarized light could transmit through the analyzer. If the analyzers are formed with metal gratings or wire grid polarizers, the transmission axis is generally perpendicular to the grating finger directions. FIG. 9(a) is capable of analyzing the linear polarization states of the output beam, i.e. the first three Stokes components $[S_0, S_1, S_2]^T$ of the Stokes vector of the output beam.

FIG. 9(b)-(d) present three embodiments of the 2×2 analyzer array which is able to measure not only the linear polarization states, but also circular polarization states, hence the full Stokes vector of the output beam could be analyzed. FIG. 9(b) comprises two linear analyzers, and two circular analyzers in the four sub-apertures. They are a 0° horizontal linear analyzer 204, a 90° vertical linear analyzer 205, a right-hand circular analyzer 206, and a left-hand circular analyzer 207. FIG. 9(c) also comprises two linear analyzers, and two circular analyzers in the four sub-apertures. They are a 45° linear analyzer 208, a 135° linear analyzer 209, a right-hand circular analyzer 210, and a left-hand circular analyzer 211. FIG. 9(d) comprises three linear analyzers, and one circular analyzers in the four sub-apertures. They are a 30° linear analyzer 212, a 90° linear analyzer 213, a 150° linear analyzer 214, and a left-hand circular analyzer 215. Note that throughout this patent, the direction of polarization (including that of circular polarization) is defined from the perspective of the detector.

Preferably, all these four sub-aperture analyzers in FIG. 9(b)-(d) are configured with the same materials, a linear polarizer and a quarter-wave plate. A left-hand circular polarizer consists of a linear polarizer and a quarter-wave plate, where the fast axis direction of the quarter-wave plate is rotated 45° counterclockwise with respect to the transmission axis of the linear polarizer. In contrast, a right-hand circular polarizer consists of a linear polarizer and a quarter-wave plate, where the fast axis direction of the quarter-wave plate is rotated 45° clockwise with respect to the transmission axis of the linear polarizer. Elements 204, 205, 208, 209, 212, 213, and 214 are configured as FIG. 9(e) so that the linear polarizer is facing toward the incident light (denoted by the arrow), and the quarter-wave plate is at the back closer to the detector. This is the standard setup for a circular polarizer, and the light output after the setup in FIG. 9(e) will be circularly polarized. However, as part of the 2×2 analyzer array, circular polarizers 204, 205, 208, 209, 212, 213, and 214 all function as linear analyzers. In contrast, elements 206, 207, 210, 211, and 215 are configured by flipping the same type of circular polarizers, so that the quarter-wave plate is facing toward the incident light, and the linear polarizer is at the back closer to the detector, as shown in FIG. 9(f). After flipping, the original left-hand circular polarizer functions as a left-hand circular analyzer, which could transmit left circularly polarized light, but extinguish right circularly polarized light. Similarly, after flipping, the original right-hand circular polarizer functions as a right-hand circular analyzer, which could transmit right circularly polarized light, but extinguish left circularly polarized light.

It is possible to use another configuration, where elements 204, 205, 208, 209, 212, 213, and 214 are composed of linear polarizers only, without the quarter-wave plate at the back. However, the benefit of using the configuration of FIG. 9(e)-(f), is that the absorption spectra of all four analyzers are the same, which simplifies radiometric calibration, and improves the measurements accuracies.

Specifically, it's preferable that all these four sub-aperture analyzers in FIG. 9(d) are configured from one type of left-hand circular polarizer. Elements 212, 213, and 214 are left-hand circular polarizers function as linear analyzers, whereas 215 is a left-hand circular analyzer, configured by flipping the same type of left-hand circular polarizer, so that the quarter-wave plate is facing the incident light.

Similar to the configuration in FIG. 9(b)-(d), the 2×2 analyzer array could also comprise three right circular polarizers and a reversed right circular polarizer, or three right circular polarizer and a reversed left circular polarizer, or three left circular polarizer and a reversed right circular polarizer, etc.

It is important to point out that the embodiments of the 2×2 analyzer array in FIG. 9(a)-(d) and other described embodiments could also be treated as embodiments of a "unit cell", sometimes also called a "super pixel", to be used in the polarization sensitive layers of 134 and 135 previously shown in FIG. 4. The unit cells or the super pixels are the smallest polarization analyzing units in a polarization sensitive layer. A repetitive pattern of these unit cells, each consisting of a 2×2 analyzer array, could be fabricated on chip within the detector system to enable imaging polarimetry measurements.

Figure 10:
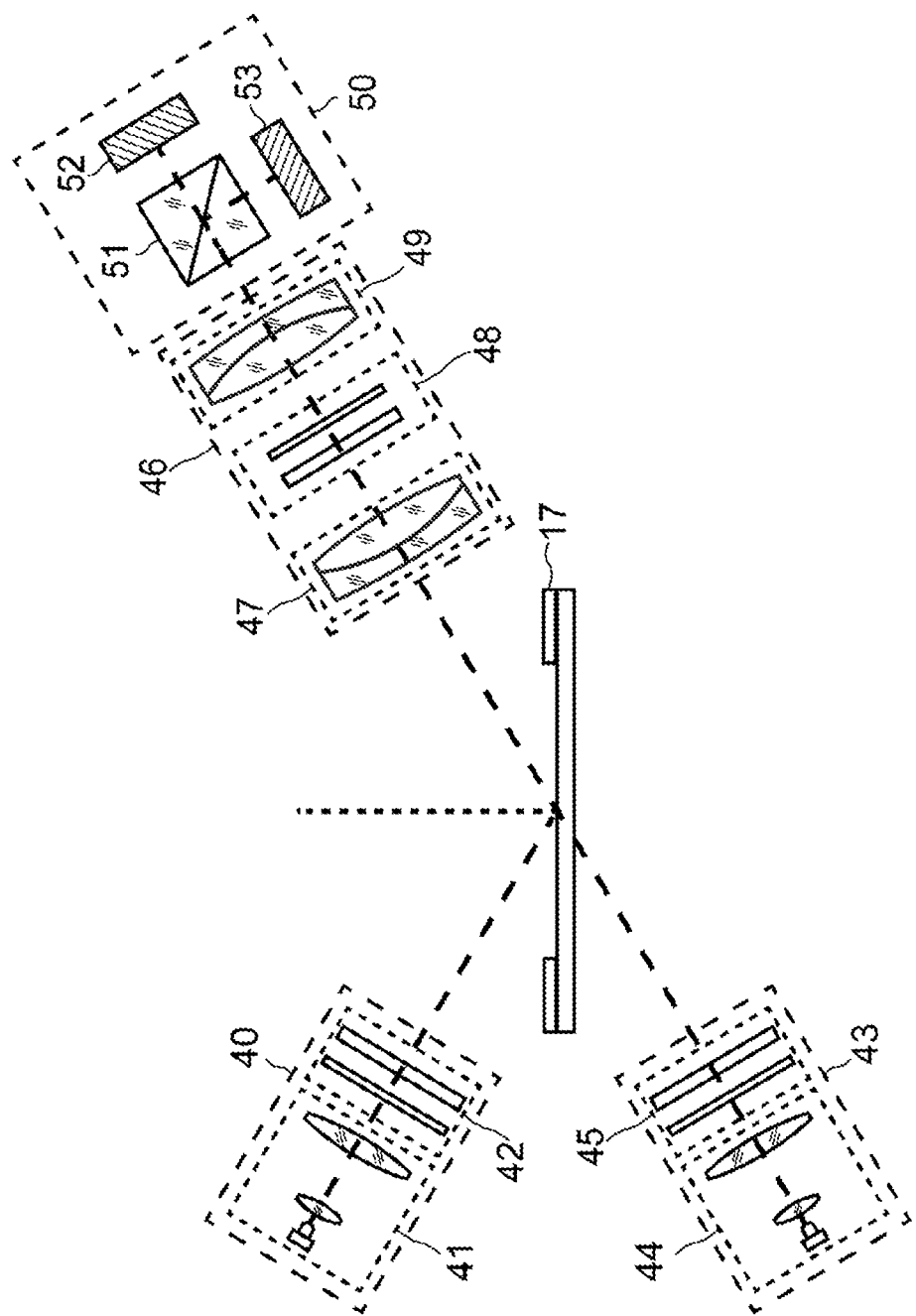
FIG. 10 presents Embodiment 8 of the plant spectropolarimetric imaging device, where both the illumination arm and the detection arm are at relatively large angles with respect to the surface normal of the sample stage, close to the Brewster angle.

FIG. 10 presents another embodiment, Embodiment 8 of the disclosed device. The key feature of Embodiment 8 is that both the illumination arm and the detection arm are at relatively large angles with respect to the surface normal of the sample stage, close to the Brewster angle. A first illuminator 40 directs light from a first light source 41 through a first polarization generator system 42. The first polarization generator system 42 comprises a linear polarizer and a rotating retarder. However, the first illuminator 40 could be any of the previously disclosed illuminator embodiments, including different light sources and different polarization generator systems. A second illuminator 43 directs light from a second light source 44 through a second polarization generator system 45. The first and second illuminators direct light from opposite sides of a sample stage 17. In the detection arm, an imaging system 46 comprises an objective group 47, a polarization analyzer system 48, and a focusing group 49. 46 is similar to the imaging system 15 in FIG. 2, except the detection arm in FIG. 10 is close to the Brewster angle, and forms a specular reflection pair with regard to the illumination arm. Similar to FIG. 2, light is preferably collimated after the objective group 47. The polarization analyzer system 48 comprises a rotating retarder and a linear analyzer in FIG. 10, though it could be any embodiment of the previously disclosed polarization analyzer system. Further, a detection system 50 includes a dichroic beamsplitter 51, a detector 52 sensitive to the visible spectrum, and another detector 53 sensitive to the infrared spectrum. The detection system 50 could have more dichroic beamsplitters or other dispersive elements and matching detectors to operate in ultraviolet, visible, near-infrared, short-wave infrared, mid-wave infrared and long-wave infrared.

The chief ray angle of the illumination at the sample placed at a sample stage 17 is close to 55°, which is close to the Brewster angle of most plant leaves. Preferably, the illumination angle of the first illuminator 40, the second illuminator 43 and the detection angle of the imaging system 46 could all be adjustable. More preferably, both the azimuthal angle and the polar angle are adjustable.

Figure 11:
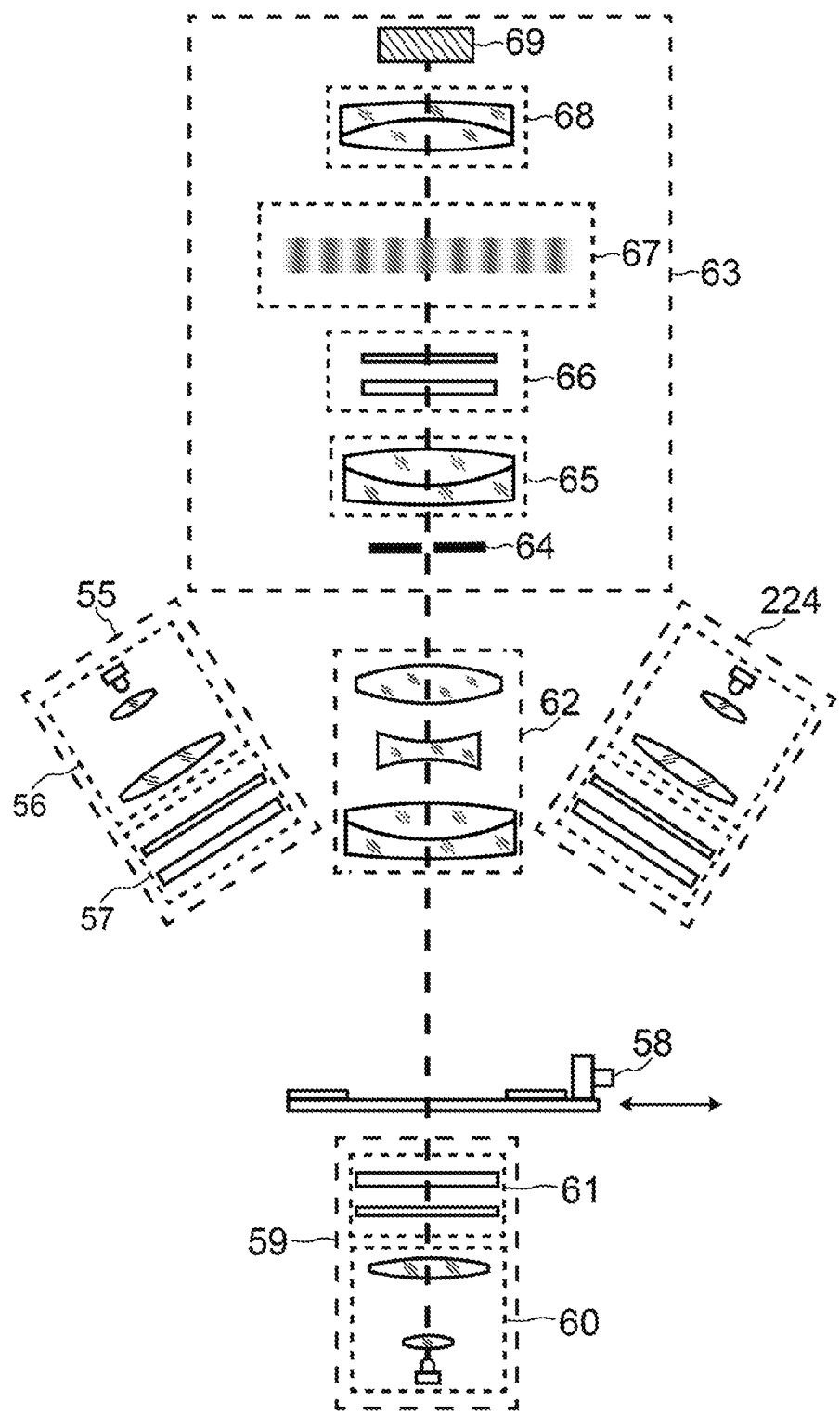
FIG. 11 presents Embodiment 9 of the plant spectropolarimetric imaging device, where the detection system is a transmissive spectrometer system.

FIG. 11 presents another embodiment, Embodiment 9 of the disclosed device, which is a hyperspectral imaging device, where the detection system is a transmissive spectrometer system. A first illuminator 55 directs light from a first light source 56 through a first polarization generator system 57. The first illuminator 55 is FIG. 11 is similar to 40 in FIG. 10, though the embodiments of the first illuminator 55 could be any of the previously disclosed illuminator embodiments. Preferably, light is collimated after 56 and before entering 57. The first polarization generator system 57 could be any embodiment of the previously disclosed polarization generator system, and the specific embodiment in FIG. 11 comprises a linear polarizer and a rotating retarder. Similar to the case in FIG. 2, the first illuminator could further comprise an optional symmetric group 224, with 55 and 224 being symmetric with respect to the optical axis. Light from the first broadband illuminator then reaches at least a portion of a plant sample (not shown) on a scanning translational stage 58. Preferably, the translational stage 58 is digitally controlled to move in a horizontal plane (indicated by an arrow) during a measurement. A second illuminator 59 directs light from a second light source 60 through a second polarization generator system 61 and illuminates the sample from a substantially opposite direction. Preferably, the illuminators could adjust the illumination angles with respect to the surface normal of the plant sample stage with a rotatable arm to achieve a large range of incident angles. Light reflected or transmitted from the sample is collected by an imaging system 62, which could be a lens imaging system, a mirror imaging system or a catadioptric imaging system. After the imaging system 62, light enters a transmissive spectrometer system 63. In a preferred embodiment of 63, light passes through a slit 64, and the slit 64 is located at the image plane of the imaging system 62, and it spatially filters out one slice of the object to avoid overlap of dispersed beams from two spatial dimensions. Light further passes through a collimating lens group 65, a polarization analyzer system 66, a transmission grating 67, and a focusing group 68. In a preferred embodiment, 67 is a volume phase holographic (VPH) transmission grating as shown in FIG. 11. The embodiment of the transmission grating 67 could also be a diffractive lens, a prism, a Bragg grating, or other functionally similar dispersion elements. Light then passes a focusing group 68 and reaches a detector 69. The detector 69 could be a charge-coupled device (CCD), a complementary metal-oxide-semiconductor (CMOS), or other functionally similar image recording device. The polarization analyzer system 66 could also be fabricated on chip in the detector 69 as previously shown in FIG. 4. In some embodiments, the detector 69 comprises a plurality of detectors in order to detect a broad wavelength range. For example, the detector could comprise a dichroic mirror with a silicon-based visible-near infrared (VNIR) detector and an InSb-based or InGaAs-based short-wave infrared (SWIR) detector. Typically, the detector could be used to obtain hundreds or thousands of or even more spectral channels for hyperspectral imaging.

Such a hyperspectral imaging device combines imaging polarimetry with spectroscopy. Each image is a line on the sample constraint by the slit 64, spreading out at different spectral channels. With the scanning translational stage 58 continuously moving and scanning the sample, a two-dimensional image of the sample and a third dimension of the spectrum are recorded and subsequently analyzed.

Figure 12:
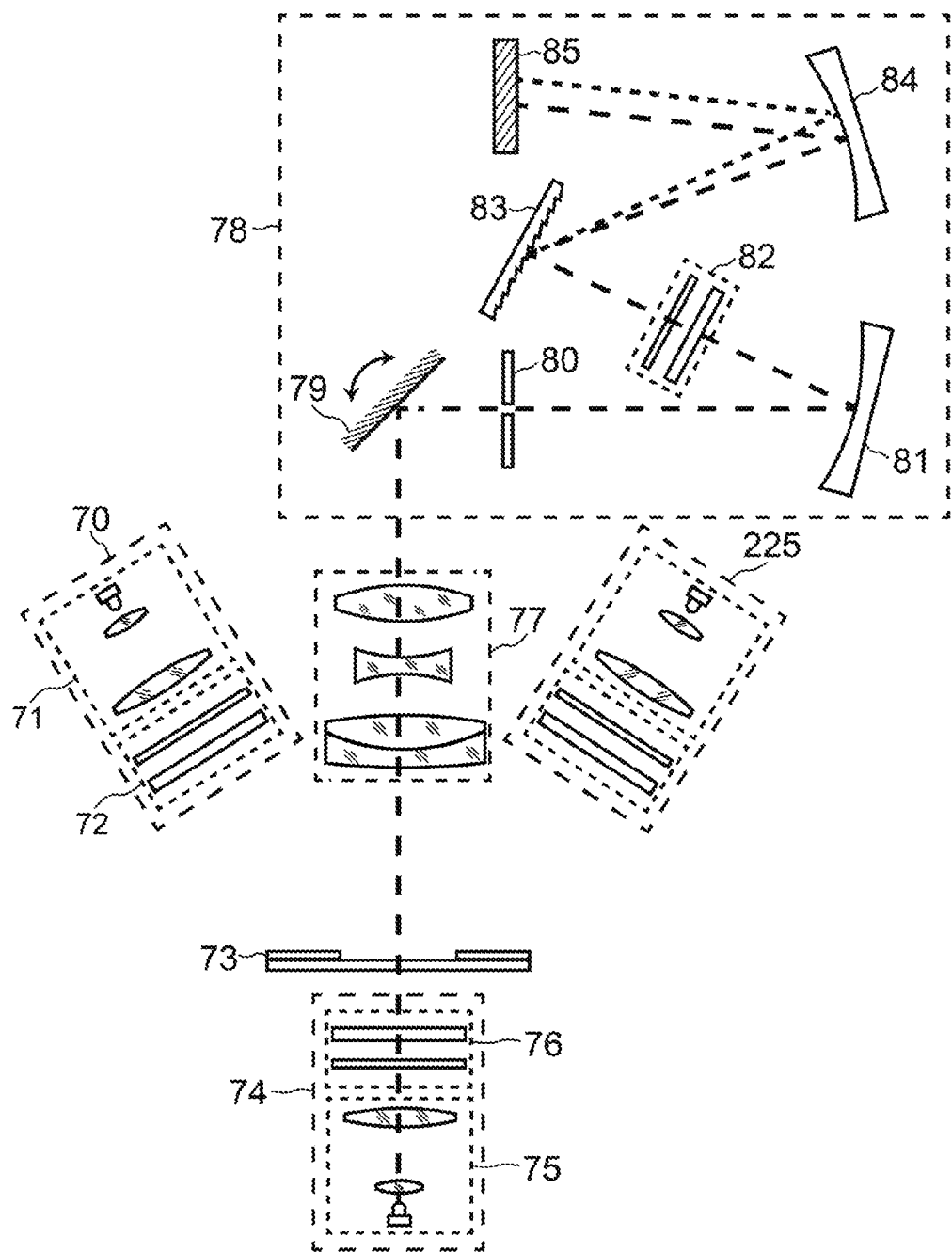
FIG. 12 presents Embodiment 10 of the plant spectropolarimetric imaging device, where the detection system is a reflective spectrometer system

FIG. 12 presents another embodiment, Embodiment 10 of the disclosed device, which is a hyperspectral imaging device, where the detection system is a reflective spectrometer system. The illumination setup is similar to that in FIG. 11. A first illuminator 70 comprises a first light source 71 and a first polarization generator system 72. The first illuminator could further comprise an optional symmetric group 225, with 70 and 225 being symmetric with respect to the optical axis. A second illuminator 74 comprises a second light source 75 and a second polarization generator system 76. The first and second illuminator direct light toward a sample stage 73 from substantially opposite directions. Preferably, the illuminators could adjust the illumination angles with respect to the surface normal of the plant sample stage with a rotatable arm to achieve a large range of incident angles, and both azimuthal and polar angles are adjustable. An imaging system 77 forms images of the sample (not shown) placed on 73. A reflective spectrometer system 78 follows the imaging system 77, where a rotatable scanning mirror 79 guides light to a slit 80. One preferred embodiment of the scanning mirror 79 is a rotatable polygon scanner. The spectrometer system 78 could have many different configurations. In FIG. 12, a Czerny-Turner configuration is illustrated as one preferred embodiment. The slit 80 is preferably located at an intermediate image plane of the preceding imaging system 77 to spatially filter the intermediate image of the sample and maintain only one spatial dimension at a time, in order to avoid overlap of dispersed beams from two spatial dimensions. A collimating mirror 81 turns the input beam from the slit 80 into a collimated beam before reaching a polarization analyzer system 82 and a grating 83. The polarization analyzer system 82 could be any embodiment of the previously disclosed polarization analyzer systems, and the specific embodiment in FIG. 12 comprises a rotating retarder and a linear analyzer. Light of different wavelengths disperse into different directions after diffraction from the grating 83, and reaches a focusing mirror 84, which directs different wavelength onto different regions on a detector 85. The image recorded in the detector 85 contains one spatial dimension and one spectral dimension. The detector 85 could be a CCD, CMOS, or other functionally similar image recording device. The detector could also be a polarization image sensor, with the polarization analyzer system integrated on chip to replace 82 in FIG. 12. Further, similar to the detector 69 in FIG. 11, the detector 85 could comprise a plurality of detectors responsive to different spectral ranges in order to detect a broad wavelength range simultaneously.

Note that other spectrometer configurations such as a Littrow configuration, and an Ebert-Fastie configuration are also possible. Further, the grating in FIG. 12 could be ruled on a concave or convex surface, and correspondingly, an Eagle spectrometer, a Wadsworth spectrometer, a Dyson spectrometer, or other similar configurations could be used.

Figure 13:
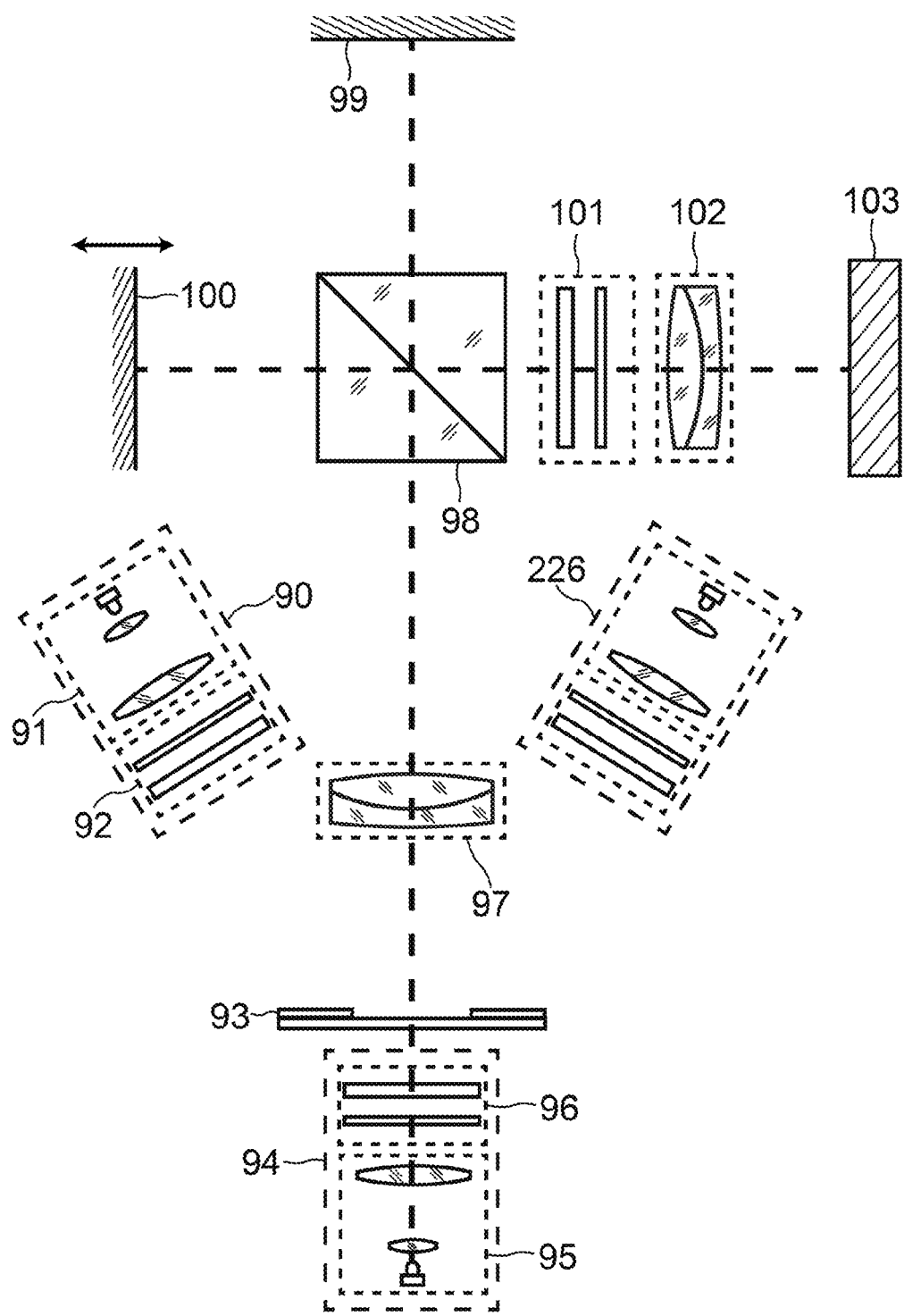
FIG. 13 presents Embodiment 11 of the plant spectropolarimetric imaging device, which comprises an imaging Fourier transform spectrometer system.

In FIG. 11 and FIG. 12, a transmission grating or a reflective grating is employed. Generally speaking, these dispersive elements tend to have large polarization property variations with wavelength, hence a careful calibration process is usually necessary to reduce instrumental spectropolarimetric errors, and the signal-to-noise ratio is sometimes compromised at certain wavelength regions. FIG. 13 presents a new embodiment, Embodiment 11 of the disclosed device, which is a hyperspectral imaging device for plant imaging with an imaging Fourier transform spectrometer system. The imaging Fourier transform spectropolarimetric system has the advantage that the instrumental polarimetric effects are usually much smaller than the ones with dispersive elements, and the polarimetric effects do not change rapidly with wavelength. In FIG. 13, a first illuminator 90 comprises a first light source 91, and a first polarization generator system 92. The first illuminator could further comprise an optional symmetric group 226, with 90 and 226 being symmetric with respect to the optical axis. A second illuminator 94, comprises a second light source 95, and a second polarization generator system 96. The first and second illuminator direct light toward a sample (not shown) on a sample stage 93 from substantially opposite directions. Preferably, the illuminators could adjust the illumination angles with respect to the surface normal of the plant sample stage with a rotatable arm to achieve a large range of incident angles, and both azimuthal and polar angles are adjustable. An objective group 97 collimates light from each point in the object plane of the sample into a beam bundle along a certain direction. The collimated beam is split at a beamsplitter 98, which directs a fraction of the beam toward a stationary mirror 99, and the other fraction of the beam toward a moving mirror 100 mounted on a motorized stage (moving direction shown by the arrow). Preferably, 98 is a non-polarizing beamsplitter. There are many possible embodiments of the beamsplitter 98, including but not limited to a cube beamsplitter, a plate beamsplitter, a pellicle beamsplitter, and a diffractive beamsplitter. Preferably, the optical path lengths within the beamsplitter 98 are the same for the two branches. The reflected beams from the two mirrors are both partially reflected by the beamsplitter 98 to pass through a polarization analyzer system 101. The beams then enter a focusing group 102 and form an interferogram on a detector 103. Before entering 102, the reflected beams from the same object point reflected by 99 and 100 would have the same direction (though a lateral shear between these two beams is possible due to the movement of 100), hence they would recombine at the same image point at 103. Each pixel at 103 would record the interference of the two beams. In this setup, element 97 could be considered as the imaging system, and elements 98-103 in total could be considered as the detection system, which is a polarimetric Fourier transform spectrometer system. The resultant interferograms are recorded by the broadband detector 103. With the movement of the moving mirror 100, usually driven by a step motor, the optical path difference (OPD) of the two beams could be varied, and the detector 103 will record a sequence of interferograms. In some embodiments, the detection system could comprise a plurality of detectors responsive to different spectral ranges in order to detect a broad wavelength range simultaneously. With Fourier transform of the time evolution of the signal at each pixel, the spectrum at each object point could be revealed.

In order to obtain polarimetric information of the sample, a plurality of the polarization setups of the first or second polarization generator system and the polarization analyzer system could be employed. For each polarimetric setup, the moving mirror 100 could move across the total travel distance. Alternatively, the polarimetric measurements could also be taken at each position of the moving mirror 100, so that a sequence of interferogram with varying polarization setups of both the polarization generator system and the polarization analyzer system could be taken, before the mirror 100 moves to a different position.

In some embodiments, in order to precisely locate the mirror position, an additional laser system (not shown in FIG. 13), such as a He—Ne system, could be employed. Also, at zero optical path difference, all wavelengths of light will interfere constructively and generate a spike in the interferogram. To establish a zero optical path difference position as a reference position, an additional white light source (not shown) could be further used in the imaging Fourier transform spectropolarimetric system.

Note that in some embodiments, the beamsplitter in the Fourier transform spectrometer system could also be a polarizing beamsplitter, so that polarizing interferometer configurations, such as a Martin-Puplett polarizing interferometer could be used.

Figure 14:
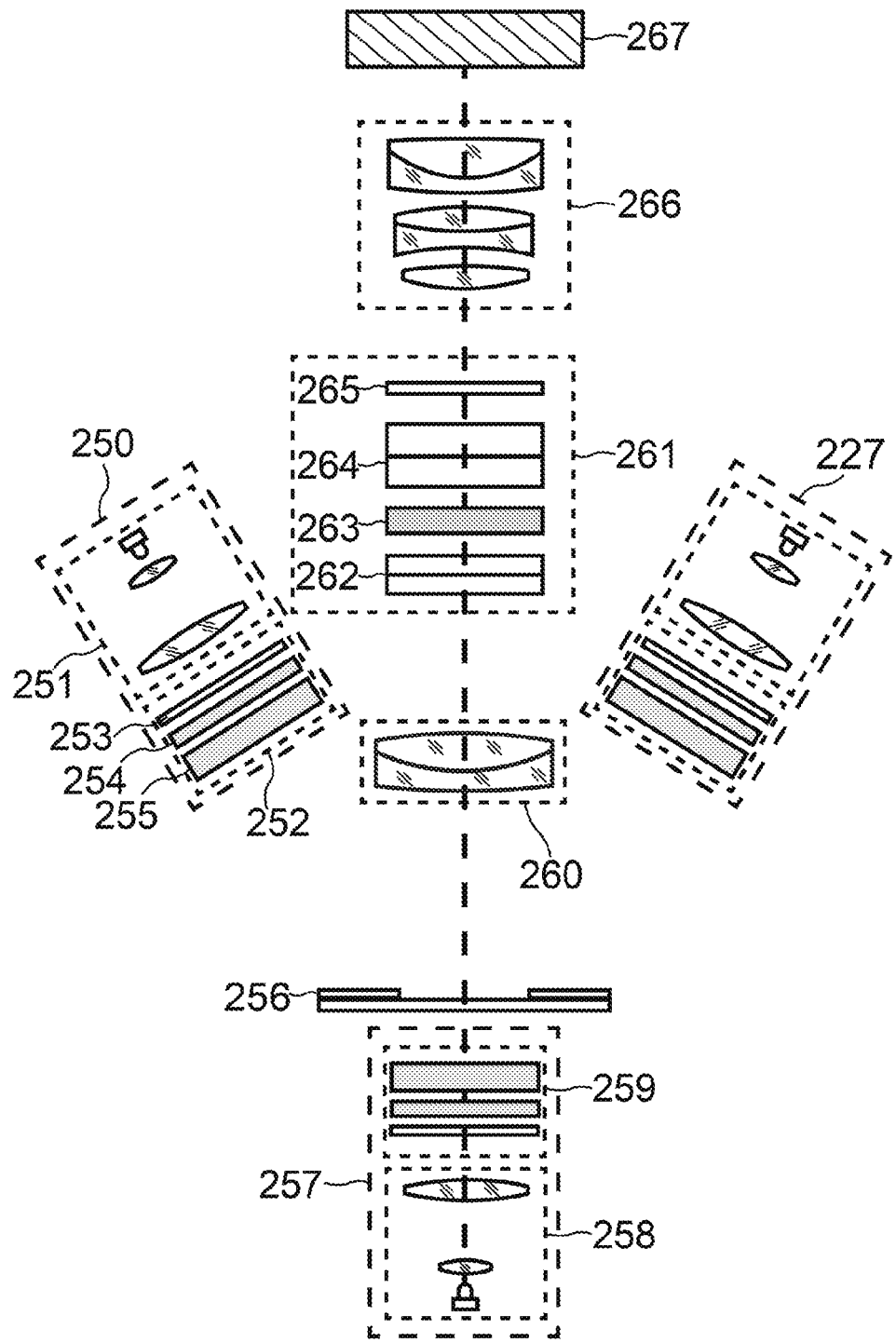
FIG. 14 presents Embodiment 12 of the plant spectropolarimetric imaging device, which is a snapshot spectropolarimetric system.

FIG. 14 presents another embodiment, Embodiment 12 of the disclosed device, which is a snapshot spectropolarimetric system. A first illuminator 250, comprises a first light source 251, and a first polarization generator system 252. Preferably, the polarization generator system 252 comprises a linear polarizer 253, a first high-order retarder 254 and a second high-order retarder 255. Both high-order retarders are optically thick such that their phase retardance values vary considerably with wavelength $\lambda$. One embodiment of a high-order retarder is an optically thick calcite plate. Preferably, the transmission axis of the linear polarizer 253 and the fast axis of the second high-order retarder 255 are along the same direction, and the fast axes of 254 and 255 are at 45° to each other. The first illuminator could further comprise an optional symmetric group 227, with 250 and 227 being symmetric with respect to the optical axis. A second illuminator 257, comprises a second light source 258 and a second polarization generator system 259 (similar to the first polarization generator system 252). The first and second illuminators direct light toward a sample (not shown) at a sample stage 256 from substantially opposite directions. Preferably, the illuminators could adjust the illumination angles with respect to the surface normal of the plant sample stage with a rotatable arm to achieve a large range of incident angles, and both azimuthal and polar angles are adjustable. An objective group 260 collimates light from each point in the object plane of the sample into a beam bundle along a certain direction. The collimated beam passes through a polarization analyzer system 261, which comprises a first Savart plate 262, an achromatic half-wave plate (AHWP) 263, a second Savart plate 264, and a linear analyzer 265. The two Savart plates 262 and 264 each consists of two equal thickness uniaxial crystal subplates such that the optic axes of both subplates are aligned at 45° to the surface normal and rotated 90° with respect to each other. The achromatic half-wave plate 263 could be made of a Fresnel rhomb or a combination of several waveplates with compensating birefringence and matching retardance. After passing the polarization analyzer system 261, light passes through a focusing group 266, and reaches a detection system 267. Elements 260-266 in total constitute the imaging system of this setup. The detection system could be a broadband detector as shown in FIG. 14, or it could comprise a plurality of detectors, each sensitive to a different spectral region, and these detectors could be aligned with dichroic mirrors.

Similar to FIG. 14, other snapshot imaging spectrometer system could be employed, such as a computed tomography imaging spectrometer (CTIS), an image mapping spectrometer (IMS), etc. Combining snapshot spectrometer with disclosed polarimetric components, high throughput, fast spectropolarimetric imaging of plants could be achieved.

Note that the previously disclosed spectrometer systems are all used in the detection side. However, some of these spectrometer systems could be readily modified to be placed in the illumination side and function as a monochromator. These setups could also enable spectropolarimetric imaging of plant samples.

Figure 15:
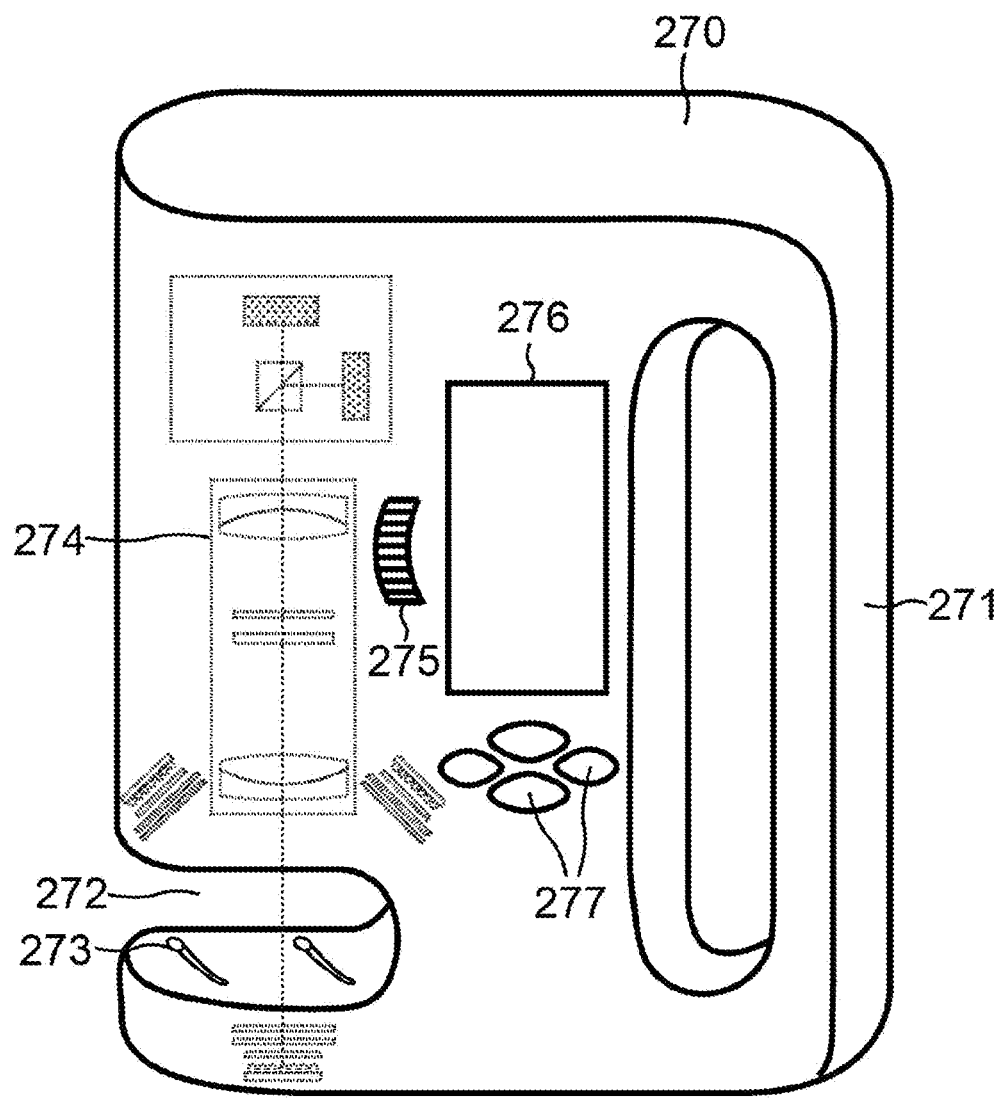
FIG. 15 presents Embodiment 13, which is a portable plant spectropolarimetric imaging device.

The disclosed plant spectropolarimetric imaging device could be a stationary device, but it also could be a portable device easy to deploy in the field. FIG. 15 presents Embodiment 13, which is a portable plant spectropolarimetric imaging device. The exterior case 270 includes a handle 271, which is convenient to grip with one hand. A narrow recess 272 in the case allows the plant parts, such as a leaf to be inserted into the object side of the imaging system. A clip set 273 is optionally used to hold a sample still, and in FIG. 15, 273 comprises a pair of clips. The interior optical system 274 is similar to the setup as previously shown in FIG. 2, and it's shown in dashed line to indicate it's embedded inside of the case 270. The interior optical system 274 could also be a miniaturized version of any previously disclosed embodiments. Part of a focus adjustment knob 275 is exposed outside of the case to allow the adjustment of the focus of the optical system 274. A liquid crystal display (LCD) screen 276 in the case can directly report imaging results in real time. The screen control buttons 277 are used to control the LCD. In a preferred embodiment, the portable device is powered by batteries (not shown) to ensure flexibility. However, in some embodiments, a power cord could also be employed to supply electric power to operate the device.

Figure 16:
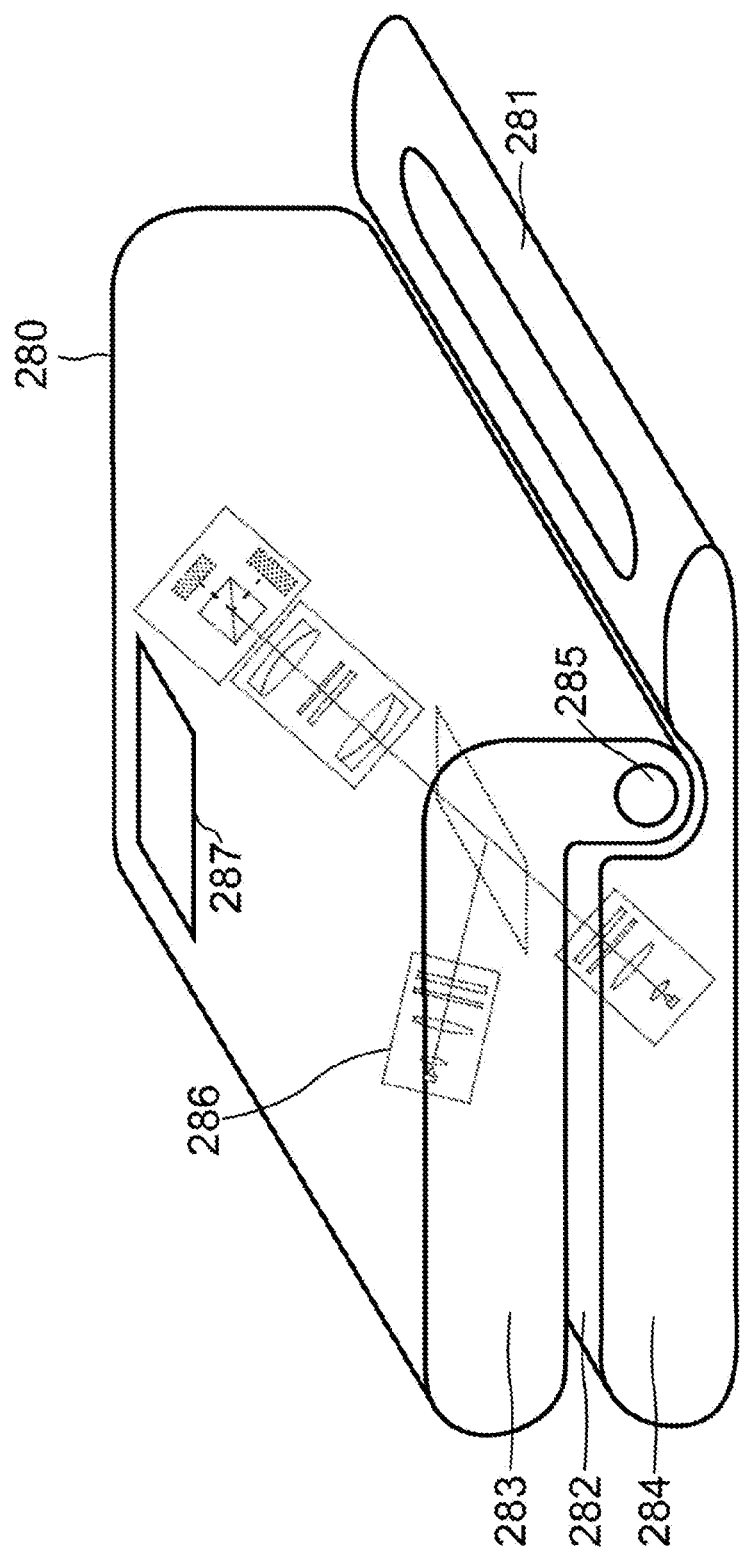
FIG. 16 presents Embodiment 14, which is another portable plant spectropolarimetric imaging device.

FIG. 16 presents Embodiment 14, which is another portable plant spectropolarimetric imaging device. The exterior case 280 includes a handle 281 to be gripped by an operator. A narrow recess 282 is formed by two parts, part 283 and part 284. The recess 282 allows a sample such as a plant leaf to be placed inside. A hinge 285 makes the whole device foldable and it enables the adjustment of the angle between part 283 and part 284, which can be of a larger angle to allow bigger parts of a plant, such as a stem, to be imaged. Further, the hinge 285 makes the interior of the recess 282 more accessible and easier to clean. Preferably, an adjustable latch (not shown in FIG. 16) is employed to secure different positions of part 283 and part 284 around the hinge 285. An optical system 286 is embedded inside of the case 280. In one embodiment as shown in FIG. 16, the optical system 286 has a form similarly to that previously disclosed in FIG. 10, where the epi-illumination illuminator and the detection system are embedded in part 283, and the transillumination illuminator is embedded in part 284. A liquid crystal display screen 287 provides real time feedback.

The device could be held by an operator to move across a leaf of a plant in the field, so that a scanning across the leaf surface can be achieved by the movement of the device, without any invasive measures, such as removing a leaf from a plant.

The plant stress evaluation method disclosed in this invention is mainly based on three aspects: the spatial morphology, spectral reflectance or transmittance, and polarization properties. In general, spectral information reveals the molecular and chemical composition of a sample, while the polarimetric information reveals the shape, texture, and surface roughness, etc. Joint analysis of both spectral and polarimetric information in a certain spatial area by the disclosed spectropolarimetric imaging device provides a comprehensive characterization of a plant sample. The resultant information could be used to distinguish different plants and different parts of the same plant, differentiate various growth stages, evaluate the health of a plant, and estimate the severity of a stress, etc.

The spatial morphology is clearly illustrated with each 2D image at a specific wavelength, under a specific polarization setup. Morphological changes are usually more prominent when evaluated together with spectral or polarimetric information.

The spectral reflectance or transmittance data provide rich information for plant health evaluation. In the visible spectral range, the plant pigment absorption is the major factor affecting reflectance and transmittance. In the near-infrared, pigment absorption is weak, and scattering determines the reflectance and transmittance. In the mid-wave infrared and long-wave infrared, water absorption plays a key role. As a specific example, if a leaf is infected with rust fungi, it will have increased reflectance in the visible green and red channels around 500 nm to 700 nm to present an orange to brown color at the infected patches due to a large number of urediniospores or aeciospores of the rust fungi. Rust infected leaves may present slightly reduced reflectance in near infrared spectral channels around 800 nm to 850 nm.

As another example, if a leaf is infected with downy mildew, the growth of the sporangiophores on the underside of infected leaves may increase the reflectance on the upper side of the leaf in the visible green and red spectrum around 550 nm to 700 nm, and lower the reflectance in the near infrared spectrum around 800 nm to 900 nm. At an early infection stage, the downy mildew lesion in the upper surface of an infected leaf will present a yellow color, with significantly increased reflectance in the red and green color channels. As the lesion grows into a relatively late stage, the infected region becomes dry and brittle, and turns into a brown color, and the reflectance in green color channel is lower compared with a healthy leaf, but the red color channel reflectance may still be slightly higher than a healthy leaf.

As yet another example, if a plant leaf is under water stress, the overall reflectance tends to increase, especially in the SWIR and MWIR range. From the reflectance spectrum, a normalized difference water index (NDWI) widely known in the prior art could be used to estimate the water content.

$$\mathrm{NDWI}=(T_{NIR}-T_{SWIR})/(T_{NIR}+T_{SWIR}), \quad (1)$$

is often used. One pair of the wavelength bands that can be chosen for NDWI is NIR-860 nm, SWIR-1240 nm, as described in Gao, B. C., 1996. "NDWI—A normalized difference water index for remote sensing of vegetation liquid water from space." *Remote sensing of environment*, 58(3), pp. 257-266.

Further, the polarization properties may change after the plant is under stress. For example, rust fungi will depolarize the reflected light, hence when the polarization setup is adjusted for a series of polarization generator and analyzer pairs, the irradiance variation of the recorded images could be smaller compared to that of a healthy leaf. Also, the downy mildew sporangiophores are also depolarizing scatterers, when the underside leaf surface is illuminated. As another example, if the polarization generator system 42 and polarization analyzer system 48 in Embodiment 8 in FIG. 10 are both of p-polarization (polarization orientation lies parallel to the plane of incidence), and if epi-illumination is utilized for a healthy leaf with relatively smooth leaf surface, the image at the detector will be relative dark, due to the fact that the incident angles for each pixel within the field of view are all relatively close to the Brewster's angle, so that the reflected images are very dim based on the Fresnel equations of reflection. If the incident angles are not exactly at Brewster's angle, but are close to Brewster's angle, the resultant reflection image of p-polarized light is dim but not completely dark. If a leaf is infected with fungal or fungal-like diseases, such as rust, the conidia or spores will act as diffusers to depolarize incident light and the reflected light will be of both p and s polarization. Therefore, the resultant image tends to be brighter than that of a healthy leaf with epi-illumination at close to Brewster's angle.

As another example of plant polarization property change, when the leaf senescence occurs, chlorophyll breaks down and photosynthesis declines. Compared to healthy leaves, less visible light is being absorbed (especially red and blue portions, where chlorophyll has strong absorption), and more multiple scattered and reflected light could reach the detector. Hence the degree of polarization at the red and blue portions of the visible spectrum will decrease.

Mathematically, the polarimetric analysis for plant imaging could be done with four different methods, ranging from rudimentary to complete characterization. (1) The polarization generator system and the polarization analyzer system could be as simple as two linear polarizers. The polarizer pair could be oriented of parallel or orthogonal polarization states. Reflectance pair $R_{//}$ (measured with parallel polarizers) and $R_\perp$ (measured with orthogonal polarizers), and related parameters, for example, $R_{//}/R_\perp$, $(R_{//}-R_\perp)/(R_{//}+R_\perp)$ could all be used to evaluate linear polarization properties of the plant sample, with $R_{//}-R_\perp$ associated with the surface reflection, $2R_\perp$ associated with deep multiple-scattering reflection, and $R_{//}+R_\perp$ associated with the total back scattered light. Similarly, for transmission analysis, related parameters such as $T_{//}$, $T_\perp$, $T_{//}/T_\perp$, and $(T_{//}-T_\perp)/(T_{//}+T_\perp)$ could be employed.

(2) The second method is used to analyze the first three Stokes components $[S_0, S_1, S_2]^T$ of the output beam in the detection side. The illumination side could generate light of a certain polarization state (such as simple linear polarization illumination), or there could be no polarization generator at all. In one case, the sunlight could be used for illumination, and a passive detection device is enough to characterize $[S_0, S_1, S_2]^T$ of the output beam. The polarization analyzer system in this method could be a simple linear polarizer to rotate at three or more different orientations. The output linear polarization state could be determined from the first three Stokes parameters. The degree of linear polarization $$DoLP = \left(\sqrt{S_1^2 + S_2^2}\right)/S_0. \tag{2}$$

In most cases of plant polarimetry with linear polarization, or unpolarized light (such as sunlight) illumination, DoLP is about one or two orders of magnitude higher than the degree of circular polarization $(S_3/S_0)$ in the resultant output beam, hence for a lot of practical diagnostic and imaging purposes, knowing the linear polarization output might be sufficient for some basic plant evaluation.

(3) The third method is used to analyze the full Stokes vector $[S_0, S_1, S_2, S_3]^T$ of the output beam in the detection side. Similar to Method (2), the illumination side could generate light of a certain polarization state, or the device could be passive, i.e. there could be no polarization generator at all. With the full Stokes vector, more parameters, for example, the degree of polarization $$DoP = \left(\sqrt{S_1^2 + S_2^2 + S_3^2}\right)/S_0, \tag{3}$$

the degree of circular polarization $$DoCP = S_3/S_0, \tag{4}$$

the orientation angle $$\Psi = (1/2)\arctan(S_2/S_1), \tag{5}$$

and the ellipticity angle $$\chi = (1/2)\arcsin(S_3/S_0), \tag{6}$$

could all be evaluated.

The circular polarization measurements contain chiral molecular information, which provides additional characterization for plants.

(4) The fourth polarimetric analysis method is used to analyze the full 4×4 Mueller matrix of a sample. This method requires active, variable illumination polarization states, and controllable and variable polarization analyzer states. Usually, at least 16 independent measurements have to be taken, but with a priori knowledge of the sample, or some simplification in modeling (such as some assumed symmetrical relations in the Mueller matrix), sometimes, the required measurements could be reduced.

Under a certain polarization generator and polarization analyzer setup, the Stokes vector of the output beam is $$S_{out} = M_a M_s G S_{in}, \tag{7}$$

where $S_{in}$ is the Stokes vector of the input beam from the light source, G is the Mueller matrix of the polarization generator system, $M_s$ is the Mueller matrix of the sample, $M_a$ is the Mueller matrix of the polarization analyzer system.

An analyzer vector A, which is a 1×4 row vector, could be formed by the detector vector D and the Mueller matrix of the polarization analyzer system $M_a$, $$A = DM_a = [a_0, a_1, a_2, a_3], \tag{8}$$

where the detector vector $D = [d_0, d_1, d_2, d_3]$. Note $D = [1, 0, 0, 0]$, if the detector is polarization insensitive. The output irradiance I of the detector is $$I = AM_s P, \tag{9}$$

where $P = GS_{in}$ is a 4×1 column vector. In element multiplication form, Eq.(9) is $$I = \sum_{i,j=0}^{3} a_i m_{ij} p_j = \sum_{i,j=0}^{3} w_{ij} m_{ij} \tag{10}$$

where $w_{ij} = a_i p_j$, and $a_i$ is the i-th element of A, and $p_j$ is the j-th element of P.

A polarimetric measurement vector (a 1×16 row vector) W' could be defined as $$W' = [w_{00}, w_{01}, w_{02}, w_{03}, w_{10}, w_{11}, w_{12}, w_{13}, \ldots w_{32}, w_{33}] \tag{11}$$

and Eq.(10) could be rewritten as the product (a scalar) of a row vector and a column vector, by flattening the Mueller matrix of the sample $M_s$ into a 16×1 Mueller vector $$M = [m_{00}, m_{01}, m_{02}, m_{03}, m_{10}, m_{11}, m_{12}, m_{13}, \ldots, m_{32}, m_{33}]^T. \tag{12}$$

A series of Q measurements could be taken to determine the Mueller matrix. For the q-th measurement, where $q = 0, 1, \ldots Q-1$, the generator vector $P = [p_{q,0}, p_{q,1}, p_{q,2}, p_{q,3}]^T$, and the analyzer vector $A = [a_{q,0}, a_{q,1}, a_{q,2}, a_{q,3}]$ form the q-th polarimetric measurement vector $$W_q = [w_{q,00}, w_{q,01}, w_{q,02}, w_{q,03}, w_{q,10}, \ldots, w_{q,33}] \tag{13}$$

where $W_{q,ij} = a_{q,i} p_{q,j}$, and the q-th output irradiance I of the detector is $$I_q = W_q M, \tag{14}$$

A polarimetric measurement matrix W, where $W_q$ is the q-th row, could be formed, and a set of measured irradiances could form a vector I, $$I=WM, \quad (15)$$

Or $$\begin{bmatrix} I_0 \\ I_1 \\ \vdots \\ I_{Q-1} \end{bmatrix} = \begin{bmatrix} w_{0,00} & w_{0,01} & \cdots & w_{0,33} \\ w_{1,00} & w_{1,01} & \cdots & w_{1,33} \\ \vdots & \vdots & \cdots & \vdots \\ w_{Q-1,00} & w_{Q-1,01} & \cdots & w_{Q-1,33} \end{bmatrix} \begin{bmatrix} m_{00} \\ m_{01} \\ \vdots \\ m_{33} \end{bmatrix} \quad (16)$$

If W contains 16 linearly independent columns, all the 16 elements of the Mueller vector M and the Mueller matrix $M_s$ of the sample could be determined. If Q=16, the Mueller vector is $$M = W^{-1}I, \quad (17)$$

In general, Q>16, and M is overdetermined, and the pseudoinverse of W could be used to calculate the Mueller vector $$M = (W^T W)^{-1} W^T I = UI, \quad (18)$$

where $U=(W^T W)^{-1} W^T$ is the pseudoinverse of W, and generally referred to as the data reduction matrix. Rearrange the elements of the Mueller vector M, and the Mueller matrix $M_s$ of the sample is obtained.

Note this Mueller matrix is usually for a specific geometric setup, with a certain azimuth and a certain polar angle for transmission or scattering Mueller matrix characterization. If directional variation is of importance, a plurality of measurements with geometric setups of varying azimuthal and polar angles might be necessary.

After the Mueller matrix of the sample is obtained, a polar decomposition could be employed to decompose the Mueller matrix into the product of a diattenuator, a retarder and a depolarizer, such as the classical form originally proposed by Lu and Chipman in "Interpretation of Mueller matrices based on polar decomposition". JOSA A. 1996 May 1; 13(5):1106-13, $$M_s = M_\Delta M_R M_D, \quad (19)$$

Note that the matrix multiplication is not commutative, and the three factors in the polar decomposition are order dependent. Other forms of polar decompositions in different orders could also be employed, but preferably, a certain polar decomposition order is chosen so that the interpretation is consistent for all samples.

From Method (1) to Method (4), the polarization characterization capability gradually increases at the cost of system complexity. The appropriate choice depends on the specific application.

All these four polarimetric analysis methods could be applied to analyze each individual spectral channel independently. The combination of the spectral and polarimetric analysis could offer critical information for plant evaluation, and provide a versatile instrument not possible in the prior art.

After the images of the plant samples are taken, spectropolarimetric imaging analysis could be conducted to evaluate plant health or the severity of plant stresses, help distinguish healthy and stressed plants, etc. Depending on the features or parameters of phytological interest, the imaging analysis steps of the recorded images may vary. In general, the imaging analysis comprises steps of image preprocessing, segmentation and feature extraction, parameter estimation and classification, to name a few. In a preferred method, machine learning based methods are used for parameter estimation in plant health evaluation.

Image preprocessing is an important initial step to analyze the recorded raw data to set a foundation for further analysis. Image preprocessing may include image restructuring, image cropping, contrast enhancement, and removal of nonuniform illumination, etc. Image restructuring includes the process of dividing recorded images into subimages for subsequent analysis. Image cropping may be applied to digitally cut out a subimage with the region of interest. Contrast enhancement, or contrast stretch, includes multiple transform methods in both spatial domain and spectral domain. Spatial contrast enhancement methods include stretching the original data number range to fill the full gray level range, with linear, nonlinear, histogram equalization, reference stretch and other related methods. Spectral contrast enhancement methods include, for example, normalization stretch, and spatial domain blending. Removal of nonuniform illumination could be partly done with a reflectance calibration of a reference target, such as a Spectralon white diffuse reflectance target, and partly done with a high-pass filter or a homomorphic filter.

Segmentation and feature extraction aim to find a limited region of interest, reduce the original data dimensionality and obtain the most important subset of the original data to extract relevant feature information of the plant samples. This step is crucial to reduce to core image data for subsequent image analysis in order to improve processing efficiency. Usually, segmentation and feature extraction are closely related. In a lot of cases, a priori knowledge about the specific plant under imaging could help select the most effective features to be used for further processing. Common phytological features including color, spectral response, texture, shape, depth, etc. Due to the high dimensionality of hyperspectral imaging, which usually employs hundreds or even more spectral channels, feature extraction is highly preferred to reduce the hypercube data into more informative and manageable subset of the original data. Commonly used feature extraction methods include principal component analysis (PCA), minimum noise fraction (MNF), independent component analysis (ICA), spectral angle mapper (SAM) and spectral information divergence (SID), etc. Segmentation is the process of partitioning the recorded images into multiple segments, usually including the region of interest and the background. Segmentation is usually done based on some basic features, such as color, texture, etc. Common segmentation methods involve, for example, thresholding, edge detection, region growing, and clustering. Segmentation could also be done with some advanced processing methods, such as principal component analysis (PCA). Some machine learning methods, for example, artificial neural networks (ANN) and support vector machines (SVM), could also be used for segmentation. The polarimetric information disclosed in this invention will greatly facilitate segmentation and feature extraction. For example, for each polarization setup, there is a series of spectral channels, these spectropolarimetric channels could be combined and then the principal component analysis could be applied to all the spectropolarimetric channels, and the linear combination of these spectropolarimetric channels will form the principal components of the system. Sometimes, image fusion could be used as part of the feature extraction process. Image fusion is a process of combining different images, which could be multisource, multi-angle, multi-polarization images. Image fusion could potentially increase the signalto-noise ratio for multispectral or hyperspectral plant images, and emphasize the most critical parameters for plant health monitoring.

Parameter estimation and classification is usually the last step of analysis. Key parameters of the plant, plant-specific and stress-specific parameters are retrieved from the recorded images. Depending on the application, this step could be used to differentiate plants or different parts of the same plant, distinguish healthy and stressed plant samples, and quantify the stress severity, etc. In a preferred embodiment of the method, a forward physics-based model and an inverse model are used to estimate the parameters. The inverse model could be a parametric method, or a non-parametric machine learning method.

In the forward model of the parameter estimation, an input vector space of characterization parameters of the plant sample is mapped to an output vector space of the spectropolarimetric components of the plant imaging device, $$p \to x, \quad x = f(p) \tag{20}$$

$f$ is the forward mapping function, p is an input vector of plant characterization parameters, and p comprises the concentration of core components of the sample. For example, if the plant sample is a leaf, in a representative multi-layer model of the leaf, for the j-th layer, $p_j = [p_{j,th}, p_{j,ch\_a}, p_{j,ch\_b}, p_{j,car}, p_{j,anth}, p_{j,w}]$, and each component of the vector $p_j$ is a scalar to characterize a certain feature, i.e. any k-th component $p_k \in \mathbb{R}^1$. Parameter $p_{j,th}$ is the j-th layer thickness, $p_{j,ch\_a}$ is the chlorophyll-a concentration in the j-th layer, $p_{j,ch\_b}$ is the chlorophyll-b concentration, $p_{j,car}$ is the carotenoids concentration, $p_{j,anth}$ is the anthocyanin concentration, and $p_{j,w}$ is the water volume fraction in the j-th layer. A series of these thicknesses, concentrations, etc., are modeled for each layer to form the input vector $p=[p_1, p_2, \ldots, p_j, \ldots, p_{end}]$, where $p_{end}$ is the last layer in a forward model. The choices of characterization parameters for epi-illumination and transillumination could be different. Preferably, only major components which will significantly affect the signal of the detection system are necessary in the model of a sample, hence the characterization parameters of different samples, or different applications for the same sample could be different.

x is the calibrated irradiance reflectance/transmittance or the preprocessed data number of each spectral channel with each polarization setup at a certain pixel of the detector. $x=[x(\lambda_1, Pol_1), x(\lambda_1, Pol_2), \ldots, x(\lambda_1, Pol_L), x(\lambda_2, Pol_1), x(\lambda_2, Pol_2), \ldots, x(\lambda_2, Pol_L), \ldots, x(\lambda_{M-1}, Pol_1), x(\lambda_{M-1}, Pol_2), \ldots, x(\lambda_{M-1}, Pol_L), x(\lambda_M, Pol_1), x(\lambda_M, Pol_2), \ldots, x(\lambda_M, Pol_L)]$, where the subscript "L" is the total number of polarization setup, and the subscript "M" is the total number of multispectral or hyperspectral channels, and $x \in \mathbb{R}^{L \times M}$.

Other relevant parameters could also be included in the model, for example, the carotenoids concentration could be further categorized into carotene (such as α-carotene, β-carotene, etc.) concentration, and the xanthophyll (such as lutein, zeaxanthin, violaxanthin, neoxanthin, etc.) concentration. Potentially, the characterization of the plant sample could be more accurate, but on the other hand, the analysis with more parameters might be more complicated, noisier and more time-consuming. It's also preferred that the total number of parameters in the characterization vector p is smaller than the total number of spectropolarimetric channels in the system, in order to obtain robust regression. With this trade-off in mind, the choice of the forward model is aimed to quantify plant structures only with essential components, and the essential components selection may depend on the application. For example, for a simplified downy mildew detection with epi-illumination on the underside of a leaf, it might be sufficient to model the leaf as a single layer with $p=[p_{ch}, p_{hy}]$ at each pixel, where $p_{ch}$ is the chlorophyll concentration, and $p_{hy}$ is the hyphae concentration. For early stage infection detection, pattern recognition algorithms might also be used to help distinguish downy mildew hyphae and leaf trichomes (hairs) based on features such as shape, size, and tortuosity.

The forward mapping $p \to x$ could be analyzed with a deterministic or stochastic model. The deterministic model of the plant sample could be based on Fresnel equations of optical transmission and reflection, a diffusion theory model, a radiative transfer model, or a Kubelka-Munk (KM) theory model, etc. On the other hand, the most common stochastic model is a Monte-Carlo model.

A modified Kubelka-Munk theory model of a leaf is described herein, those skilled in the art could readily extend the analysis to other types of models, and other parts of plants. The main modification is to include surface reflections into calculation, which was ignored in the original Kubelka-Munk theory. Assume a leaf could be modeled as n homogenous layers, and in one model as shown in FIG. 1, a leaf could be modeled as a seven-layer structure, including an upper cuticle layer, an upper epidermis layer, a palisade mesophyll, a vascular bundle layer (this layer may or may not present depending on spatial location), a spongy mesophyll layer, a lower epidermis layer, and a lower cuticle layer. In another simplified model, a leaf could be modeled as a single layer structure, which may lose some structural details, but the calculation could be greatly simplified, and the results tend to be more robust.

The KM theory describes the resultant light from turbid materials with the irradiance transmittance ($t_n$) and reflectance ($r_n$) at each layer. Each layer is modeled as a homogenous layer of a material with a certain thickness that absorbs and scatters incident light. The irradiance transmittance $t_n(\lambda)$ and reflectance $r_n(\lambda)$ of the n-th layer are:

$$t_n(\lambda) = \frac{4\beta_n(\lambda)}{[1+\beta_n(\lambda)]^2 e^{K_n(\lambda)d_n} - [1-\beta_n(\lambda)]^2 e^{-K_n(\lambda)d_n}} \tag{21}$$

$$r_n(\lambda) = \frac{[1-\beta_n(\lambda)^2][e^{K_n(\lambda)d_n} - e^{-K_n(\lambda)d_n}]}{[1+\beta_n(\lambda)]^2 e^{K_n(\lambda)d_n} - [1-\beta_n(\lambda)]^2 e^{-K_n(\lambda)d_n}} \tag{22}$$

where $d_n$ is the thickness of the n-th layer, and $\beta_n(\lambda)$ and $K_n(\lambda)$ are $$\beta_n(\lambda) = \sqrt{A_n(\lambda)/[A_n(\lambda) + 2S_n(\lambda)]} \tag{23}$$

$$K_n(\lambda) = \sqrt{A_n(\lambda)[A_n(\lambda) + 2S_n(\lambda)]} \tag{24}$$

Further, the coefficients $A_n(\lambda)$ and $S_n(\lambda)$ are determined by the absorption coefficient $a_n(\lambda)$ and the reduced scattering coefficient $s_n'(\lambda)$ of each layer, and the final relations are dependent on the specific scattering and absorption properties of a material. In one preferred method, $$A_n(\lambda) = \frac{a_n(\lambda)}{\frac{1}{2} + \frac{1}{4}\left[1 - \frac{s_n'(\lambda)}{s_n'(\lambda) + a_n(\lambda)}\right]} \tag{25}$$

$$S_n(\lambda) = \frac{s_n'(\lambda)}{\frac{4}{3} + \frac{38}{45}\left[1 - \frac{s_n'(\lambda)}{s_n'(\lambda) + a_n(\lambda)}\right]} \tag{26}$$

and note the coefficients $A_n(\lambda)$ and $S_n(\lambda)$ could take other forms depending on the sample properties and illumination geometries.

Specifically, the absorption coefficient is dependent upon the chromophore or core component types and concentrations in a layer. For the n-th layer, the absorption coefficient in a general form could be modeled as $$a_n(\lambda) = p_{n,ch\_a} a_{ch\_a}(\lambda) + p_{n,ch\_b} a_{ch\_b}(\lambda) + p_{n,car} a_{car}(\lambda) + p_{n,anth} a_{anth}(\lambda) + p_{n,w} a_w(\lambda) \qquad (27)$$

where $a_{ch\_a}(\lambda)$, $a_{ch\_b}(\lambda)$, $a_{car}(\lambda)$, $a_{anth}(\lambda)$, and $a_w(\lambda)$ are the specific absorption coefficients of chlorophyll-a, chlorophyll-b, carotenoids, anthocyanin and water, respectively.

Similar absorption coefficients could be derived for all the other layers with different chromophore distributions, and in general, $$a_n(\lambda) = \sum_{com} p_{n,com} a_{com}(\lambda) \qquad (28)$$

where $p_{n,com}$ is the concentration of a type of chromophore or core component in the n-th layer, and $a_{com}(\lambda)$ is the specific absorption coefficient of that component.

The reduced scattering coefficient of each layer could be modeled with the form of $$s_n'(\lambda) = C_n \lambda^{-D_n} \qquad (29)$$

where the parameters $C_n$ and $D_n$ are determined experimentally or adapted from the literature. Usually, $C_n$ is directly related to plant structures that are of the dimension of the wavelength of light, including nuclei, mitochondria, ribosomes, and plastids, etc. Sometimes, a linear dependence of $C_n$ on the concentration of these plant structures could be assumed. If a plant leaf is infected with fungal or fungal-like pathogens, such as rust, $C_n$ will also be directly influenced.

In the original Kubelka-Munk theory, surface reflection of the turbid material is neglected. To precisely evaluate a plant sample, surface reflection has to be added into the model. At the interface of different layers, Fresnel equations could be used to model the irradiance transmittance and reflectance. If the illumination could be approximated as normal incidence, based on Fresnel equations with normal incidence, the irradiance transmittance $\tau_n(\lambda)$ and reflectance $\rho_n(\lambda)$ at the interface are $$\tau_n(\lambda) = \frac{4N_n(\lambda)N_{n+1}(\lambda)}{[N_{n+1}(\lambda) + N_n(\lambda)]^2} \qquad (30)$$

$$\rho_n(\lambda) = \left[\frac{N_{n+1}(\lambda) - N_n(\lambda)}{N_{n+1}(\lambda) + N_n(\lambda)}\right]^2 \qquad (31)$$

where $N_n(\lambda)$ and $N_{n+1}(\lambda)$ are the refractive indices of the incident and transmitting layer.

If the incident angle is not negligible, the complete Fresnel equations could be used to derive irradiance transmittance and reflectance for oblique incident angles, and the irradiance transmittance $\tau_n(\lambda)$ and reflectance $\rho_n(\lambda)$ have to be updated for each polarization setup:

$$\rho_n^p = \left[\frac{N_{n+1}\cos\theta_n - N_n\cos\theta_{n+1}}{N_{n+1}\cos\theta_n + N_n\cos\theta_{n+1}}\right]^2 \qquad (32)$$

$$\rho_n^s = \left[\frac{N_n\cos\theta_n - N_{n+1}\cos\theta_{n+1}}{N_n\cos\theta_n + N_{n+1}\cos\theta_{n+1}}\right]^2 \qquad (33)$$

$$\tau_n^p = 1 - \rho_n^p \qquad (34)$$

$$\tau_n^s = 1 - \rho_n^s \qquad (35)$$

where $\theta_n$ and $\theta_{n+1}$ are the incident angles in the incident and transmitting layer, and they are wavelength dependent.

Figure 17:
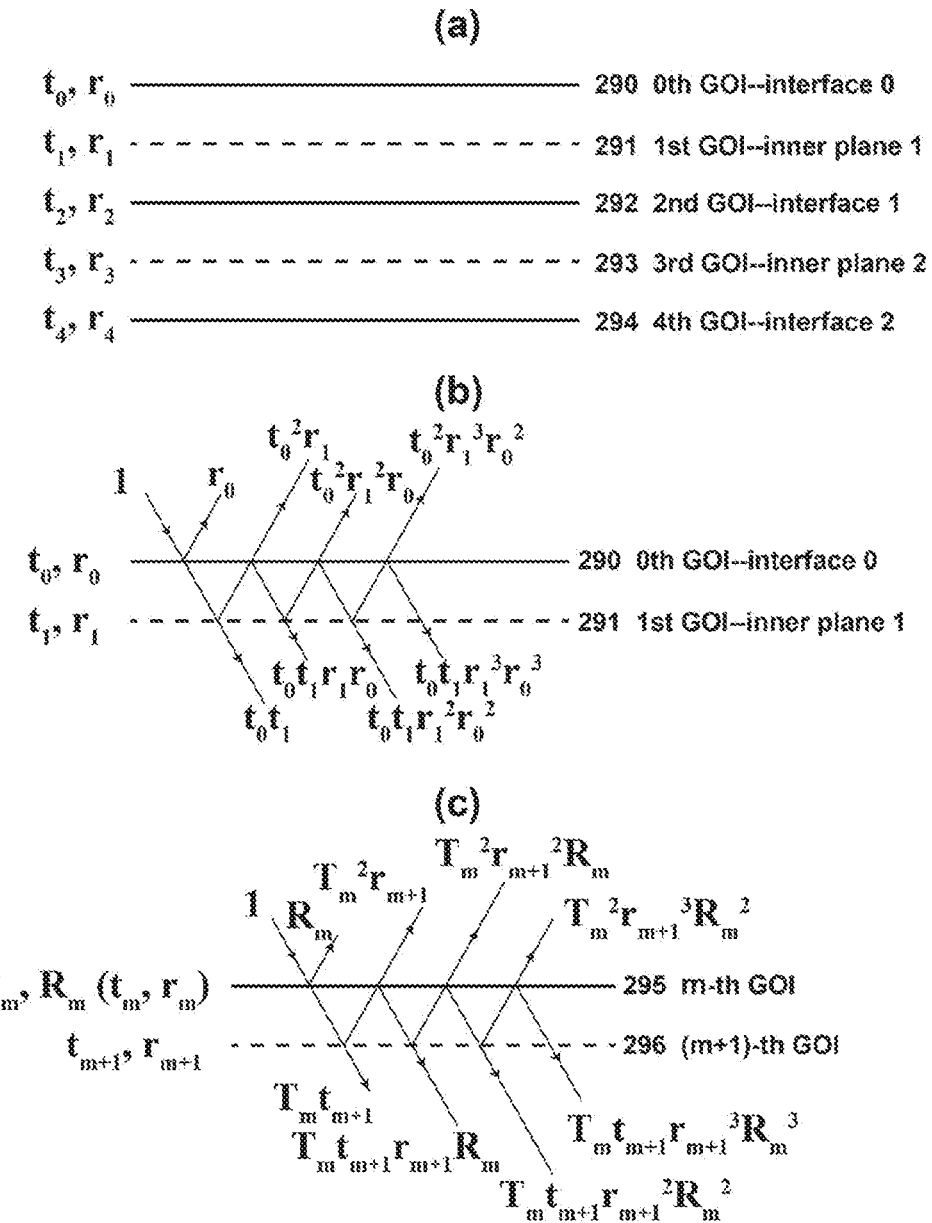
FIG. 17 presents a modified Kubelka-Munk (KM) theory model, where multiple reflections between two adjacent layers and interfaces are taken into account.

In the modified KM theory model in this invention, multiple reflections between two adjacent layers and interfaces are taken into account. After the calculation of the transmittance and reflectance of each layer with the KM theory, the net effect of the n-th layer could be modeled as if the transmission and reflection happen at a single plane, the n-th inner plane, representing each layer. Because of the material of each layer is turbid or translucent, the reflected light will add incoherently, thus the phase factors can be dropped and the exact location of the inner plane doesn't matter, as long as it's within the thickness of each layer. With this novel abstraction, each layer can be simplified as an optical plane analogous to an optical interface. Both the true optical interface and the abstracted optical interface of each layer could be referred to as the "generalized optical interface" (GOI). Hence, M=2n+1 generalized optical interfaces are obtained in total, with n inner planes from n layers, and n+1 interfaces forming the boundaries of the n layers, as shown in FIG. 17(a). The transmittance and reflectance of each generalized optical interface are denoted as $t_m$ and $r_m$. If the m-th GOI is an inner plane, representing a layer, $t_m$ and $r_m$ are calculated as Eqs. (21) and (22), if the m-th GOI is an optical interface, $t_m$ and $r_m$ are calculated as $\tau_n$ and $\rho_n$ in Eqs. (30)-(35). In FIG. 17(b), starting with the first two generalized optical interfaces, which are the interface 0 and the inner plane 1, the total reflectance and transmittance after multiple reflections in between these two layers are:

$$R_1 = r_0 + t_0^2 r_1 \sum_{k=0}^{\infty} (r_1 r_0)^k = r_0 + \frac{t_0^2 r_1}{1 - r_1 r_0} \qquad (36)$$

$$T_1 = t_0 t_1 \sum_{k=0}^{\infty} (r_1 r_0)^k = \frac{t_0 t_1}{1 - r_1 r_0} \qquad (37)$$

$R_1$, $T_1$ could be viewed as the net effect of the first two generalized optical interfaces, and be used in multiple reflections calculation with the next GOI. Hence, an iterative process could be used to calculate the total reflectance and transmittance. As shown in FIG. 17(c), in general, $R_{m+1}$, $T_{m+1}$ could be calculated from $R_m$, $T_m$ of all the previously analyzed interfaces, and $r_{m+1}$, $t_{m+1}$ of the (m+1)-th generalized optical interface:

$$R_{m+1} = R_m + \frac{T_m^2 r_{m+1}}{1 - r_{m+1} R_m} \qquad (38)$$

$$T_{m+1} = \frac{T_m t_{m+1}}{1 - r_{m+1} R_m} \qquad (39)$$

The above iteration of Eqs. (38)-(39) could be repeated until reaching the last interface or the last layer of infinite thickness in a model. The transmittance and reflectance of the entire plant sample is hence analyzed.

Further, the forward model could sometimes be directly obtained based on experimental measurements. For example, a set of leaves with different severity of rust infection could be measured, and an empirical spectropolarimetric reflectance could be obtained, with some proper interpolation and extrapolation, a forward model could be formed.

In the inverse model, the spectropolarimetric data is used to estimate the characterization parameters of the plant sample:

$$x \rightarrow p \tag{40}$$

The inverse model could be parametric or non-parametric. If a parametric method of the inverse model is used, the inverse process of the forward model is used to recover the characterization parameters. The parameter estimation based on the inverse function $f^{-1}$ of the forward model in Eq.(20) is usually difficult to obtain analytically due to the nonlinearities in the forward model, especially if there are a lot of parameters involved. However, the parameter estimation could be obtained numerically, if the forward mapping function $f$ of different combination of parameters is unique. Numerical parameter estimations could be obtained after iterations starting from a guess solution with numerical methods such as Newton-Raphson method or bisection method. The guess solution is randomly chosen within a preset parameter range based on a priori knowledge of the plant sample properties. Usually the Jacobian matrix or other similar derivative-based matrices are used in the iterative process. Sometimes, an inverse model based on least-square minimization, maximum likelihood, independent component analysis, or other parametric methods could be used for parameter estimation of simplified models of the plant sample.

If non-parametric methods are used in the inverse model, the plant characterization parameters could be estimated with a machine learning method. In the following, a support vector machine-based regression method as a representative non-parametric machine learning method for the inverse model is described.

The input training data points are $\{(x_1, p_1), (x_2, p_2), \ldots, (x_{l-1}, p_{l-1}), (x_l, p_l)\}$, where $x_i \in \mathbb{R}^{L \times M}$, $p_i \in \mathbb{R}^1$ (i.e. $p_i$ is a scalar), and the subscript "l" denotes the number of available training data pairs. Note that the spectropolarimetric response vector $x_i$ contain both spectral and polarimetric information. The training data could be generated with the aforementioned forward model, or collected from experiments. The goal of the inverse model is to find a function $g(x)$ to estimate each scalar component $p_i$ of the target vector $p$ with a maximum deviation of $\varepsilon$:

$$g(x) = \langle w, x \rangle + b \tag{41}$$

Hence given a spectropolarimetric response vector $x_i$ at a given spatial point, $g(x_i)$ is used to estimate $p_i$. However, the $\varepsilon$-precision might not be a feasible constraint sometimes, and slack variables $\xi_i$ and $\xi_i^*$ could be introduced to relax the error precision $\varepsilon$ to allow some more errors of potential outliers, with a so-called "soft margin", and the constrained optimization problem has the formulation:

$$\text{minimize } \frac{1}{2}\|w\|^2 + C\sum_{i=1}^{l}(\xi_i + \xi_i^*) \tag{42}$$

$$\text{subject to } \begin{cases} p_i - \langle w, x_i \rangle - b \leq \varepsilon + \xi_i \\ \langle w, x_i \rangle + b - p_i \leq \varepsilon + \xi_i^* \\ \xi_i, \xi_i^* \geq 0 \end{cases}$$

where $\|w\|^2 = \langle w, w \rangle$, and the constant C determines the allowed amount of deviation of the error larger than $\varepsilon$.

The above constrained optimization problem could be simplified by solving a dual problem with Lagrange multipliers. The Lagrangian function is defined as:

$$L = \frac{1}{2}\|w\|^2 + C\sum_{i=1}^{l}(\xi_i + \xi_i^*) - \sum_{i=1}^{l}(\gamma_i \xi_i + \gamma_i^* \xi_i^*) - \sum_{i=1}^{l}\alpha_i(\varepsilon + \xi_i - p_i + \langle w, x_i \rangle + b) - \sum_{i=1}^{l}\alpha_i^*(\varepsilon + \xi_i^* + p_i - \langle w, x_i \rangle - b) \tag{43}$$

where $\gamma_i$, $\gamma_i^*$, $\alpha_i$, and $\alpha_i^*$ are Lagrange multipliers, which are assistant parameters. From the saddle point condition, the partial derivatives of the Lagrangian function have to vanish, hence $$\frac{\partial L}{\partial b} = \sum_{i=1}^{l}(\alpha_i^* - \alpha_i) = 0 \tag{44}$$

$$\frac{\partial L}{\partial w} = w - \sum_{i=1}^{l}(\alpha_i - \alpha_i^*)x_i = 0 \tag{45}$$

$$\frac{\partial L}{\partial \xi_i} = C - \alpha_i - \gamma_i = 0 \tag{46}$$

$$\frac{\partial L}{\partial \xi_i^*} = C - \alpha_i^* - \gamma_i^* = 0 \tag{47}$$

Substitute Eq.(45) into Eq.(41), the support vector expansion is obtained as $$g(x) = \sum_{i=1}^{l}(\alpha_i - \alpha_i^*)\langle x_i, x \rangle + b \tag{48}$$

The dot product $\langle x_i, x \rangle$ in Eq.(48) can be construed to be a measure of similarity. For many applications, including plant evaluation, a nonlinear kernel function $K(x_i, x)$ can be constructed as a generalized measure of similarity, and the nonlinear support vector expansion is $$g(x) = \sum_{i=1}^{l}(\alpha_i - \alpha_i^*)K(x_i, x) + b \tag{49}$$

Common kernel functions include a polynomial kernel such as $K(x_i, x_j) = (x_i \cdot x_j + 1)^p$, a radial basis function kernel or a Gaussian kernel, such as $K(x_i, x_j) = \exp(-\|x_i - x_j\|^2 / 2\sigma^2)$, and a sigmoid kernel, such as $K(x_i, x_j) = \tanh(\kappa x_i \cdot x_j - \delta)$.

The constant offset parameter b could be computed with the Karush-Kuhn-Tucker (KKT) conditions, which states that the products between Lagrange multipliers and the constraints have to vanish, $$\alpha_i(\varepsilon+\xi_i-p_i+\langle w,x_i\rangle+b)=0 \qquad (50)$$

$$\alpha_i^*(\varepsilon+\xi_i^*+p_i-\langle w,x_i\rangle-b)=0 \qquad (51)$$

$$(C-\alpha_i)\xi_i=0 \qquad (52)$$

$$(C-\alpha_i^*)\xi_i^*=0 \qquad (53)$$

Together with the analysis of the Lagrange multipliers, b could be computed.

In the support vector regression analysis, each parameter of the input characterization vector $p=[p_1, p_2, \ldots, p_j, \ldots, p_{end}]$, where the j-th layer corresponds to a general form of $p_j=[p_{j,th}, p_{j,ch\_a}, p_{j,ch\_b}, p_{j,car}, p_{j,anth}, p_{j,w}]$, though the characterization parameters for different layers could be different. Any scalar $p_i$ is estimated independently with Eq. (49). Repeat the regression process for all the characterization parameters, and the parameter estimation of the plant sample could be obtained in the inverse model.

Similar process of the inverse model for plant parameter estimation could be done with other machine learning methods, for example, artificial neural networks, or k-nearest neighbors regression.

After key plant sample parameters are estimated, the classification of plant type, plant stress type, and plant stress severity could be done in a quantitative manner.

This invention uses spectropolarimetric imaging devices and methods for plant evaluation, especially for plants under stress. These stresses could be caused by abiotic factors such as water, sunlight, high salinity, nutrient deficiency, or biotic factors such as weeds, fungi, viruses, viroids, and bacteria, to name a few.

Other than evaluation during plant growth stage, the disclosed imaging devices and methods could also be used to screen fruits and crops to avoid and control food storage diseases.

Moreover, the disclosed devices and methods are focused at single plant level monitoring, especially at single leaf level. However, if the illumination part is omitted, the rest detection part could be employed as a passive spectropolarimetric measurement instrument, which could be installed on a plane or an unmanned aerial vehicle for canopy level measurements as well. In these applications, other closely related factors, such as the three-dimensional canopy configuration, including canopy gaps and shades, and leaf angle orientation, etc. have to be taken into account.

All publications, patents and patent applications referred to herein are incorporated by reference in their entirety to the same extent as if each individual publication, patent or patent application was specifically and individually indicated to be incorporated by reference in its entirety in the present application.

The invention has been described in detail with particular reference to certain preferred embodiments thereof, but it will be understood that variations and modifications can be effected within the spirit and scope of the invention.

What is claimed is:

1. A plant spectropolarimetric imaging device, comprising:
    a first illuminator to direct light toward at least a portion of a plant with epi-illumination, wherein said first illuminator is broadband, covering visible and infrared spectra;
    a second illuminator to direct light toward said at least a portion of a plant with transillumination, wherein said second illuminator is broadband, covering visible and infrared spectra, wherein said first illuminator and said second illuminator are positioned each with an azimuthal angle and a polar angle which are adjustable;
    an imaging system to form images of said at least a portion of a plant, wherein said imaging system comprises a polarization analyzer system;
    a detection system to record said images, wherein said detection system measures in a plurality of spectral channels; and
    a computer to display and analyze said recorded images from said detection system.

2. The device of claim 1, wherein said first illuminator comprises a first polarization generator system, wherein said second illuminator comprises a second polarization generator system.

3. The device of claim 2, wherein said first polarization generator system or said second polarization generator system is a member selected from a group consisting of a linear polarizer, a circular polarizer, an elliptical polarizer, a rotating linear polarizer, a combination of a linear polarizer and a rotating retarder, and a combination of a linear polarizer and two variable retarders.

4. The device of claim 1, wherein said polarization analyzer system in said imaging system is a member selected from a group consisting of a linear analyzer, a circular analyzer, an elliptical analyzer, a rotating linear analyzer, a combination of a rotating retarder and a linear analyzer, a combination of two variable retarders and a linear analyzer, and a combination of a waveplate and a polarizing beamsplitter.

5. The device of claim 1, wherein said detection system comprises at least one spectral splitting optical element, wherein said at least one spectral splitting optical element is a member selected from a group consisting of at least one dichroic beamsplitter, at least one tunable filter, and at least one grating.

6. The device of claim 5, wherein said tunable filter is a member selected from a group consisting of a liquid crystal tunable filter, an acousto-optic tunable filter, and a rotating wheel with narrow band spectral filters.

7. The device of claim 1, wherein said detection system comprises a spectrometer system.

8. The device of claim 7, wherein said spectrometer system comprises a member selected from a group consisting of a transmissive spectrometer, a Littrow spectrometer, an Ebert-Fastie spectrometer, a Czerny-Turner spectrometer, an Eagle spectrometer, a Wadsworth spectrometer, a Dyson spectrometer, and a Fourier transform spectrometer.

9. The device of claim 1, wherein said device is a snapshot spectropolarimetric system.

10. A plant spectropolarimetric imaging device, comprising:
    a first illuminator to direct light toward at least a portion of a plant with epi-illumination, wherein said first illuminator is broadband, covering visible and infrared spectra;
    a second illuminator to direct light toward said at least a portion of a plant with transillumination, wherein said second illuminator is broadband, covering visible and infrared spectra, wherein said first illuminator and said second illuminator are positioned each with an azimuthal angle and a polar angle which are adjustable;
    an imaging system to form images of said at least a portion of a plant;
    a detection system to record said images, wherein said detection system measures in a plurality of spectral channels, wherein said detection system comprises a polarization analyzer system; and a computer to display and analyze said recorded images from said detection system.

11. The device of claim 10, wherein said polarization analyzer system in said detection system comprises a plurality of analyzers in a polarization sensitive layer integrated in said detection system.

12. A method performed by a plant spectropolarimetric imaging device, comprising:
   directing light from at least one illuminator toward at least a portion of a plant, wherein said at least one illuminator is broadband, covering visible and infrared spectra, wherein each of said at least one illuminator is positioned with an azimuthal angle and a polar angle which are adjustable;
   forming images of said at least a portion of a plant with an imaging system;
   recording said images with a detection system, wherein said detection system measures in a plurality of spectral channels; and
   analyzing said recorded images with a computer,
wherein said plant spectropolarimetric imaging device comprises a polarization analyzer system in said imaging system or said detection system.

13. The method of claim 12, wherein said at least one illuminator comprises a polarization generator system.

14. The method of claim 12, wherein said at least one illuminator is a first illuminator for epi-illumination.

15. The method of claim 14, wherein said at least one illuminator further comprises a second illuminator for transillumination.

16. The method of claim 12, wherein said at least one illuminator is an illuminator positioned for epi-illumination in a first position and repositioned for transillumination in a second position.

17. The method of claim 12, wherein said detection system is a spectrometer system.

18. The method of claim 12, wherein said analyzing comprises:
   image preprocessing; segmentation and feature extraction; and parameter estimation and classification.

19. The method of claim 18, wherein said parameter estimation comprises a parametric method or a machine learning method to retrieve characterization parameters of said at least a portion of a plant.

* * * * *